(12) United States Patent
Kalabic et al.

(10) Patent No.: US 11,885,888 B2
(45) Date of Patent: Jan. 30, 2024

(54) SYSTEM FOR DISTRIBUTED VERIFICATION OF SATELLITE POSITION

(71) Applicant: Mitsubishi Electric Research Laboratories, Inc., Cambridge, MA (US)

(72) Inventors: Uros Kalabic, Jamaica Plain, MA (US); Tsz-Chun Michael Chiu, Toronto (CA); Avishai Weiss, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 465 days.

(21) Appl. No.: 17/233,785

(22) Filed: Apr. 19, 2021

(65) Prior Publication Data
US 2022/0345208 A1 Oct. 27, 2022

(51) Int. Cl.
*G01S 19/20* (2010.01)
*H04B 7/185* (2006.01)
*G01S 19/08* (2010.01)

(52) U.S. Cl.
CPC .............. *G01S 19/20* (2013.01); *G01S 19/08* (2013.01); *H04B 7/18519* (2013.01); *H04B 7/18521* (2013.01); *H04B 7/18547* (2013.01); *H04B 7/18556* (2013.01)

(58) Field of Classification Search
CPC ..... G01S 19/08; G01S 19/20; H04B 7/18519; H04B 7/18521
See application file for complete search history.

(56) References Cited

U.S. PATENT DOCUMENTS

| | | | | | |
|---|---|---|---|---|---|
| 5,490,076 | A * | 2/1996 | Rawicz | ................ | H04B 10/118 701/472 |
| 6,462,707 | B1 * | 10/2002 | Clark | ...................... | G01S 19/02 701/484 |
| 6,667,713 | B2 * | 12/2003 | Green | ..................... | G01S 19/02 342/357.31 |
| 6,859,690 | B2 * | 2/2005 | Asher | ..................... | G01S 19/40 342/357.29 |
| 8,242,954 | B2 * | 8/2012 | Urlichich | ................ | G01S 19/20 342/357.395 |
| 2011/0210890 | A1 * | 9/2011 | Laine | ..................... | G01S 19/08 342/357.58 |

* cited by examiner

*Primary Examiner* — Gregory C. Issing
(74) *Attorney, Agent, or Firm* — Gene Vinokur; Hironori Tsukamoto

(57) ABSTRACT

A satellite for implementing a protocol associated with a distributed satellite position verification system is provided. The satellite, on implementing the protocol, verifies records of positions of one or more other satellites in the distributed satellite position verification system. According to the protocol, the satellite performs, at different time instances, a first operation, a second operation, or a third operation to act as a first satellite, a second satellite, or a third satellite, respectively in the distributed satellite position verification system. When the first satellites performs the first operation, the first satellite verifies at least some positions in the records of positions of the second satellite such that the first satellite: determines a verified position of the second satellite; calculates a deviation between the verified position and a prior estimated position of the second satellite; and records the verified position into the records, based on the calculated deviation.

16 Claims, 14 Drawing Sheets

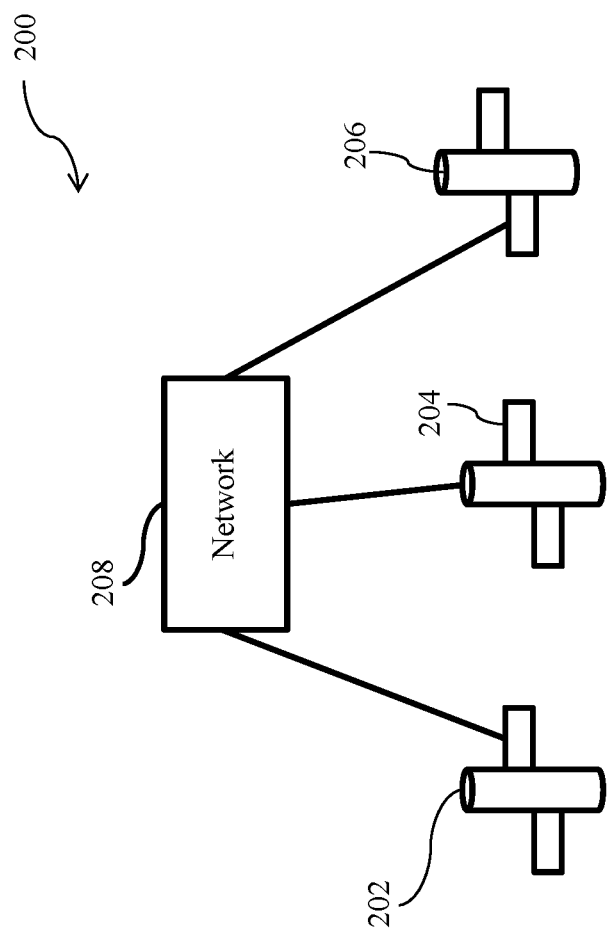

SYSTEM FOR DISTRIBUTED VERIFICATION OF SATELLITE POSITION

TECHNICAL FIELD

The present disclosure relates generally to satellites, and more particularly to a system for distributed verification of satellite position.

BACKGROUND

Currently, there are various techniques to track satellites. These techniques include ground-based satellite tracking techniques such as a ground-based optical tracking technique, a ground-based station technique, etc. In the ground-based optical tracking technique, telescopes or the like may be used to track the satellites. In the ground-based station technique, Radio Detection and Ranging (RADAR) technology or the like may be used to track the satellites.

However, these techniques may not be feasible, due to the presence of innumerable satellites in airspace. Specifically, the ground-based optical tracking technique adds additional restrictions on the satellites. For instance, the restrictions may be that the satellites should not be smaller than 10 cm in any dimension such that the satellites are large enough to be tracked in the airspace. However, in some applications, it might be possible and even desirable to further reduce the size of the satellites, as smaller satellites increase access to space for both: nations and corporations. The increased access to space is enabled only when the smaller satellites are part of a constellation, and are able to perform tasks that are conventionally done by fewer larger satellites. There may be many such constellations in space and due to their numbers and regardless of their size, place an additional burden on maintaining space situational awareness.

Accordingly, there is a need for a system to reduce reliance on ground-based satellite tracking techniques.

SUMMARY

It is an objective of some embodiments to provide a protocol for verifying positions reported by satellites such that the reliance on the ground-based satellite tracking techniques for tracking the satellites is reduced. It is also an objective of some embodiments to provide a system for implementing the protocol in a distributed manner such that the system provides advantages of robustness and scalability.

According to some embodiments, the satellites may include positioning systems to report their corresponding positions and time. Some embodiments are based on the recognition that a position reported by a satellite at a time instance may not be accurate, due to defects in the positioning system, system noise, or the like. Thereby, the position reported by the satellite tends to be an estimated current position of the satellite at a current instance of time.

To this end, some embodiments aim to verify the estimated position of the satellite. Some embodiments are based on the realization that the verification of the estimated current position of the satellite is not advantageous, as the satellite is a moving object, and thereby by the time the verification is completed the satellite may be in a different position. To this end, some embodiments formulate a prior estimated position of the satellite. The prior estimated position may be a predicted position of the satellite for a future time, which may be formulated based on dynamics of the satellite. Some embodiments are based on the understanding that a discrepancy may exist between the prediction (i.e., the prior estimated position) and reality, as the prior estimated position is formulated by considering ideal conditions.

To this end, it is an objective of some embodiments to determine a posterior estimated position (hereinafter, a verified position) of the satellite for a future time such that the posterior estimated position can replace the prior estimated position. According to the protocol, the verified position may be determined based on the position reported by the satellite. Since the position reported by the satellite may not be accurate, the satellite may participate in a telemetric exchange with one or more other satellites, where the one or more other satellites are verifier satellites that are within a line of sight of the satellite. According to the protocol, the telemetric exchange between the satellite and the one or more other satellites may be an exchange of radio signals between the satellite and the one or more other satellites. According to the protocol, the radio signals may be exchanged in a predefined order. According to the protocol, one or more observer satellites may also participate in the telemetric exchange. To this end, a position of the satellite at a particular time instance may be determined based on at least one physical property of the radio signals, if each of: the satellite, the one or more other satellite, and the at least one observer satellite report their corresponding position and time.

According to the protocol, a confidence value may be determined for the determined position. If the confidence value is within a predefined confidence bound, the verified position may be determined as a self-reported verified position. If the confidence value is not within the predefined confidence bound, the verified position may be determined as a self-reported unverifiable position. According to the protocol, if the satellite fails to report the position and time in the telemetric exchange, the verified position may be determined as an unreported position. According to the protocol, if the one or more other satellites fail to report their corresponding position and time, the verified position may be determined as a self-reported unverified position. To this end, the verified position is determined as one of the four possibilities: the self-reported verified position, the self-reported unverifiable position, the unreported position, or the self-reported unverified position.

According to the protocol, a deviation between the verified position and the prior estimated position may be calculated. For instance, the deviation may be a Euclidean distance between the verified position and the prior estimated position. According to protocol, the deviation may be compared with a predefined deviation bound. If the deviation is within a predefined deviation bound, the verified position may be recorded into records of positions of the satellite, based on an order of preference. In some embodiments, the verified position may be logged into the records of the positions of the satellite as a block chain transaction. If the deviation is not within the predefined deviation bound, the verified position may be rejected.

According to the protocol, a privilege associated with the satellite may be withdrawn based on at least one of a trust violation score, a participation violation score, and a confidence violation score.

According to the protocol, to withdraw the privilege associated with the satellite, the trust violation score for the satellite may be computed. Further, the trust violation score may be compared with a predefined trust violation score bound. Furthermore, if the trust violation score is greater than the predefined trust violation score bound, the privilege associated with the satellite may be withdrawn.

According to the protocol, to withdraw the privilege associated with the satellite, the confidence violation score for the satellite may be computed. Further, the confidence violation score may be compared with a predefined confidence violation score bound. Furthermore, if the confidence violation score is greater than the predefined confidence violation score bound, the privilege associated with the satellite may be withdrawn.

According to the protocol, to withdraw the privilege associated with the satellite, the participation violation score for the satellite may be computed. Further, the participation violation score may be compared with a predefined participation violation score bound. Furthermore, if the participation violation score is greater than the predefined participation violation score bound, the privilege associated with the satellite may be withdrawn.

According to an embodiment, a satellite configured to implement a protocol associated with a distributed satellite position verification system is provided. The satellite includes a positioning system configured to estimate a current position of the satellite at a current instance of time and a transceiver configured to participate in a telemetric exchange with one or more other satellites. The satellite further includes a processor coupled with stored instructions implementing the protocol, the stored instructions when executed by the processor cause the satellite to: generate a report recording the estimated current position of the satellite and verify records of positions of the one or more other satellites in the distributed satellite position verification system. The distributed satellite position verification system includes a first satellite, a second satellite, and a third satellite. The first satellite is configured to perform a first operation. The second satellite is configured to perform a second operation. The third satellite is configured to perform a third operation. According to the protocol, the satellite performs, at different time instances, the first operation, the second operation, or the third operation to act as the first satellite, the second satellite, or the third satellite, respectively. According to the protocol, the first satellite is configured to verify at least some positions in the records of positions of the second satellite by performing the first operation, such that the first satellite is configured to: determine a verified position of the second satellite by participating in the telemetric exchange with the second satellite and a third satellite; calculate a deviation between the verified position of the second satellite and a prior estimated position of the second satellite; and record the verified position into the records of positions of the second satellite, based on the calculated deviation.

BRIEF DESCRIPTION OF THE DRAWINGS

FIG. 2A illustrates a schematic diagram of a distributed satellite position verification system, according to some embodiments of the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
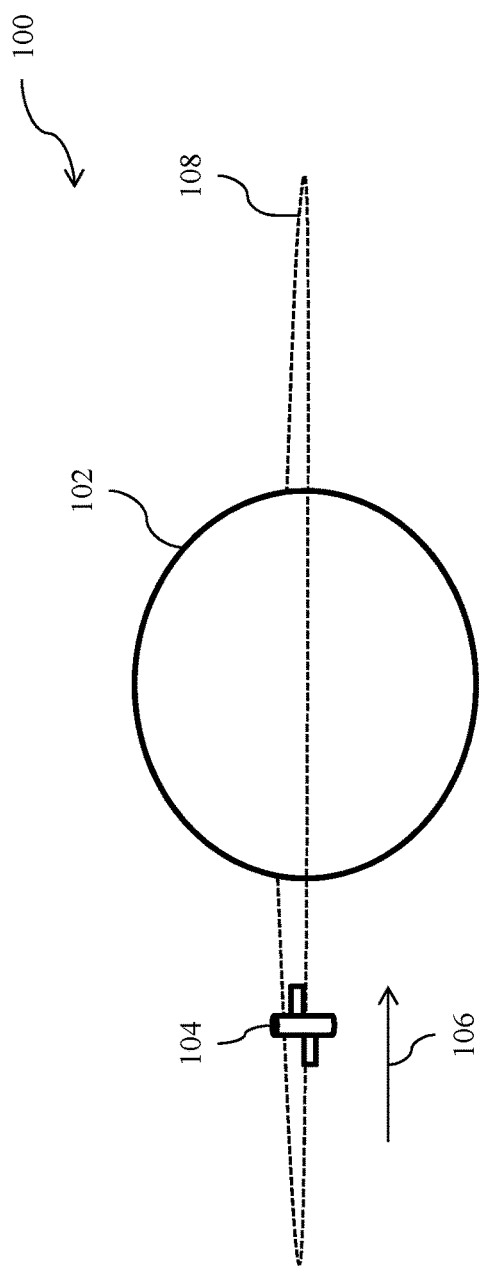
FIG. 1A illustrates an exemplary scenario showing a satellite revolving around earth, according to some embodiments of the present disclosure.

FIG. 1A illustrates an exemplary scenario 100 showing a satellite 104 revolving around earth 102, according to some embodiments of the present disclosure. The satellite 104 is a machine that is used in various applications such as communication applications, navigation applications, military applications, and the like. The satellite 104 revolves around the earth 102 in a circular orbit (or an elliptical orbit) 108 in a direction 106 (or in an opposite direction to the direction 106), when subjected to a natural force such as gravity. For example, the satellite 104 revolves around the earth 102, when a momentum associated with the satellite 104 is balanced with the natural force of gravity. Some embodiments are based on the understating that the satellite 104 may fail to revolve around the earth 102 in the circular orbit 108, when the balance between the momentum associated with the satellite 104 and the natural force of gravity is not maintained. For instance, the satellite 104 may fall back to the earth 102 or may disappear in airspace. Thereby, the satellite 104 may fail to perform its intended application.

Some embodiments are based on the realization that a failure of the satellite 104 to perform its intended application may be identified by determining positions (three-dimensional positions) associated with the satellite 104 over a period of time. According to some embodiments, the position of the satellite 104 at a time instance may be determined by sending signals of predefined frequencies from a ground-based system located on the earth 102. However, the determination of the position of the satellite 104 using the ground-based system is not feasible, due to the presence of innumerable satellites in the airspace. To this end, some embodiments aim to include a Global Navigation Satellite System (GNSS) (e.g., Global Positioning System (GPS)) into the satellite 104 to record and report its position and time. Some embodiments are based on the recognition that the GNSS may fail to accurately report the position of the satellite 104, due to system defects, system noises, and the like. Thereby, the position reported (or recorded) by the GNSS may tend to be an estimated current position of the satellite at current instance of time.

To this end, some embodiments aim to verify the estimated current position of the satellite 104. Some embodiments are based on the realization that the verification of the estimated current position of the satellite is not advantageous, as the satellite is a moving object, and thereby by a time the verification is completed the satellite 104 may be in a different position. To this end, some embodiments formulate a prior estimated position of the satellite 104. For instance, the prior estimated position of the satellite 104 may be formulated as explained in the detailed description of FIG. 1B.

Figure 1B:
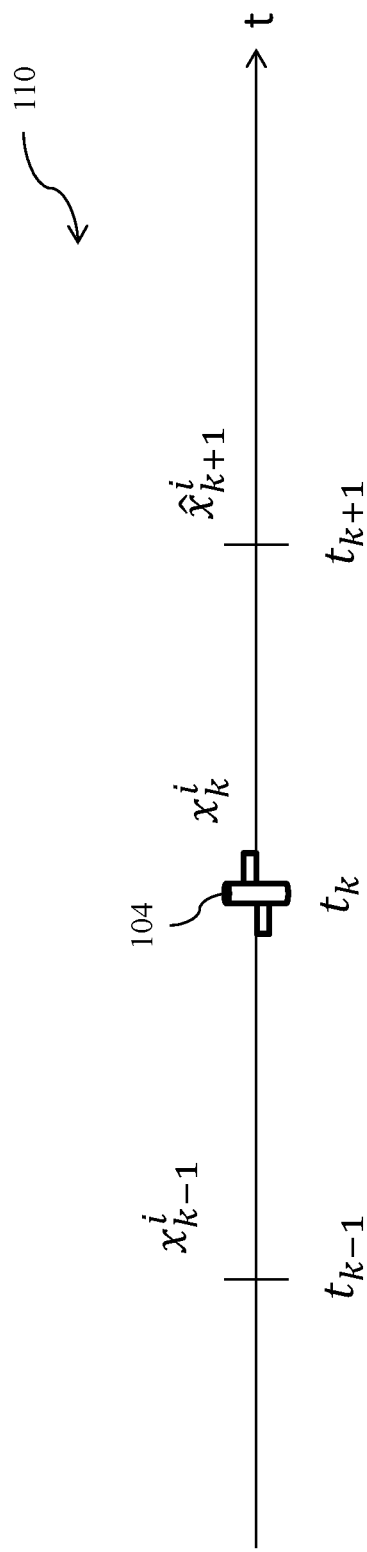
FIG. 1B illustrates a schematic for formulating a prior estimated position of the satellite, according to some embodiments of the present disclosure.

FIG. 1B illustrates a schematic 110 for formulating the prior estimated position of the satellite 104, according to some embodiments of the present disclosure. The satellite 104 obeys laws of physics, thereby, orbital dynamics governing a motion of the satellite 104 in the circular orbit 108 are given by ordinary differential equation as follows:

$$\ddot{x}^i(t) + \frac{\mu}{\|x^i(t)\|^3} x^i(t) = a^i(x^i(t), t) \qquad \text{equation (1)}$$

where the notation $x^i(t)$ is the three-dimensional position of the satellite 104 in an inertial frame of reference, the notation t is time, the notation μ is earth's gravitational parameter, and the notation $a^i$ is a forcing function that summarizes accelerations acting on the satellite 104 due to orbital perturbations. The gravitational parameter μ may be numerically equal to $$3.97 \cdot 10^5 \frac{km^3}{s^2}.$$

According to an embodiment, when the forcing function is zero (i.e., $a^i=0$), the satellite 104 traces out a circular trajectory (e.g., the circular orbit 108), an elliptical trajectory, or a hyperbolic trajectory with the earth 102 at its center.

The position of the satellite 104 at discrete points in time $t_k$ can be determined by discretizing the equation (1). In some embodiments, the discretization of the equation (1) may be performed by using a central difference method, because discretization of the equation (1) using the central difference method preserves the shape of the trajectory of the satellite 104. For instance, the discretization of the equation (1) is given as follows:

$$x^i_{k+1} - 2x^i_k + x^i_{k-1} + \frac{h^2 \mu}{\|x^i_k\|^3} x^i_k = 0 \qquad \text{equation (2)}$$

where the notation $x^i_k \triangleq x^i(t_k)$ is the position $x^i(t)$ of the satellite 104 at time $t=t_k$, a sequence $t_k$ satisfies $t_{k+1}=t_k+h$. Further, by rearranging the equation (2), the prior estimated position of the satellite 104 may be formulated. For instance, when the two positions $x^i_k$ and $x^i_{k-1}$ are known, the prior estimated position of the satellite 104 may be mathematically formulated as follows:

$$\hat{x}^i_{k+1} \triangleq \left(2 - \frac{h^2 \mu}{\|x^i_k\|^3}\right) x^i_k - x^i_{k-1} \qquad \text{equation (3)}$$

where the notation $\hat{x}^i_{k+1}$ is the prior estimated position of the satellite 104. In an example case, the position $x^i_k$ may be the estimated current position of the satellite 104 at the current time $t_k$, and the position $x^i_{k-1}$ is an estimated previous position of the satellite 104 at a previous time $t_{k-1}$. For example, the estimated current position $x^i_k$ and the estimated previous position $x^i_{k-1}$ may be self-reported positions reported by the GPS of the satellite 104. Since the prior estimated position $\hat{x}^i_{k+1}$ depends on the self-reported positions which may not be accurate and further since the dynamics of equation (2) are idealized that do not include naturally occurring perturbations on the satellite 104, a discrepancy may exist between a prediction (i.e., the prior estimated position) and reality, when the satellite 104 performs a maneuver. Notably, the discrepancy may be proportional to strength of the maneuver.

To this end, it is an objective of some embodiments to provide a protocol for determining a posterior estimated position $x^i_{k+1}$ of the satellite 104 at time $t_{k+1}$ such that the posterior estimated position $x^i_{k+1}$ can replace the prior estimated position $\hat{x}^i_{k+1}$ to avoid the discrepancy. Hereinafter, 'posterior estimated position' and 'verified position' may be interchangeably used to mean the same. For instance, a system for executing and implementing the protocol may be as explained in the detailed description of FIG. 2A and FIG. 2B.

Figure 2B:
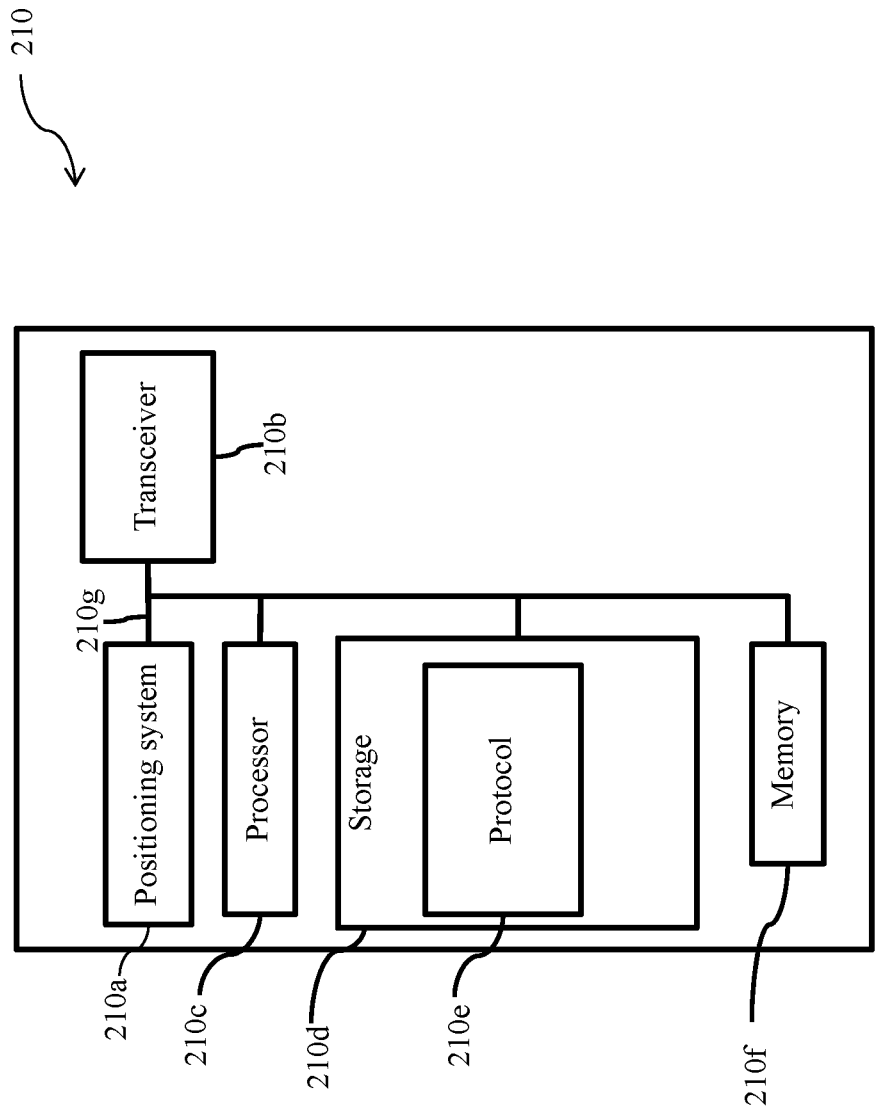
FIG. 2B illustrates a block diagram of a satellite, according to some embodiments of the present disclosure.

FIG. 2A illustrates a schematic diagram of a distributed satellite position verification system 200, according to some embodiments of the present disclosure. According to an embodiment, the distributed satellite position verification system 200 may include at least a first satellite 202, a second satellite 204, and a third satellite 206. The distributed satellite position verification system 200 may further include a network 208. The network 208 may be a distributed network that is configured to execute the protocol. The network 208 may be formed by constellation operators or satellite operators associated with the first satellite 202, the second satellite 204, and the third satellite 206. Each of the first satellite 202, the second satellite 204, and the third satellite 206 may be connected to the network 208. According to an embodiment, the distributed satellite position verification system 200 may be enabled, when each of the first satellite 202, the second satellite 204, and the third satellite 206 is configured to implement (or follow) the protocol that is executed by the network 208. According to the protocol, the first satellite 202 is configured to perform a first operation, the second satellite 204 is configured to perform a second operation, and the third satellite 206 is configured to perform a third operation. For instance, a satellite for implementing the protocol is as explained in the detailed description of FIG. 2B.

FIG. 2B illustrates a block diagram of a satellite 210, according to some embodiments of the present disclosure. The satellite 210 may include a positioning system 210a that is configured to estimate the current position of the satellite 210 at the current instance of time. For instance, the positioning system 210a may correspond to the Global Navigation Satellite System (GNSS) or the like. The satellite 210 may further include a transceiver 210b that is configured to participate in a telemetric exchange with one or more other satellites. For instance, the transceiver 210b may correspond to a Radio Frequency (RF) transceiver or the like. Furthermore, the satellite 210 may include a processor 210c configured to execute stored instructions, as well as a memory 210f that stores instructions that are executable by the processor 210c. For instance, the processor 210c may be a single core processor, a multi-core processor, or any number of other configurations. The memory 210f may include random access memory (RAM), read only memory (ROM), flash memory, or any other suitable memory systems. The processor 210c is connected through a bus 210g to one or more of the positioning system 210a, the transceiver 210b, the memory 210f, and a storage device 210d. Furthermore, the satellite 210 may include the storage device 210d adapted to store different modules storing executable instructions for the processor 210c. The storage device 210d may be implemented using a hard drive, an optical drive, a thumb drive, an array of drives, or any combinations thereof.

The storage device 210d may be configured to store a protocol 210e associated with the distributed satellite position verification system 200. According to an embodiment, the processor 210c may implement the protocol 210e stored on the storage device 210d, when the stored instructions on the storage device 210d are executed.

According to an embodiment, when the processor 210c executes the stored instructions, the processor 210c may cause the satellite 210 to generate a report recording the estimated current position of the satellite 210. For instance, the report generated by the satellite 210 may include the estimated current position (e.g., current three-dimensional position) of the satellite 210 and the current instance of time. Further, the processor 210c may cause the satellite 210 to perform a verification prescribed by the protocol 210e for verifying records of positions of the one or more other satellites in the distributed satellite position verification system 200. As illustrated in FIG. 2A, the distributed satellite position verification system 200 may include at least the first satellite 202, the second satellite 204, and the third satellite 206. According to the protocol 210e, the satellite 210 is configured to perform, at different time instances, the first operation, the second operation, and the third operation to act as the first satellite 202, the second satellite 204, or the third satellite 206, respectively. In an example embodiment, the satellite 210 may act, at a time instance, as at least one of the first satellite 202, the second satellite 204, or the third satellite 206, based on a trust score associated with the satellite 210. As used herein, the trust score may be a score provided to a satellite (such as the satellite 210), based on determining whether the satellite reports its position truthfully or not. According to the protocol 210e, the satellite 210 may be provided with an initial trust score, which may be reduced if the satellite 210 fails to report its position truthfully or increased if the satellite 210 reports its position truthfully. According to the protocol 210e, if the trust associated with the satellite 210 is below a trust score level (or the initial trust score), the satellite 210 is configured to perform the second operation to act as the second satellite 204. According to the protocol 210e, if the trust score associated with the satellite 210 is above the trust score level, the satellite 210 is configured to perform at least one of the first operation or the third operation to act as at least one of the first satellite 202 or the third satellite 206, respectively. Further, the first operation performed by the first satellite 202, the second operation performed by the second satellite 204, and the third operation performed by the third satellite 206 are as explained in the detailed description of FIG. 3A-FIG. 3E.

Figure 3A:
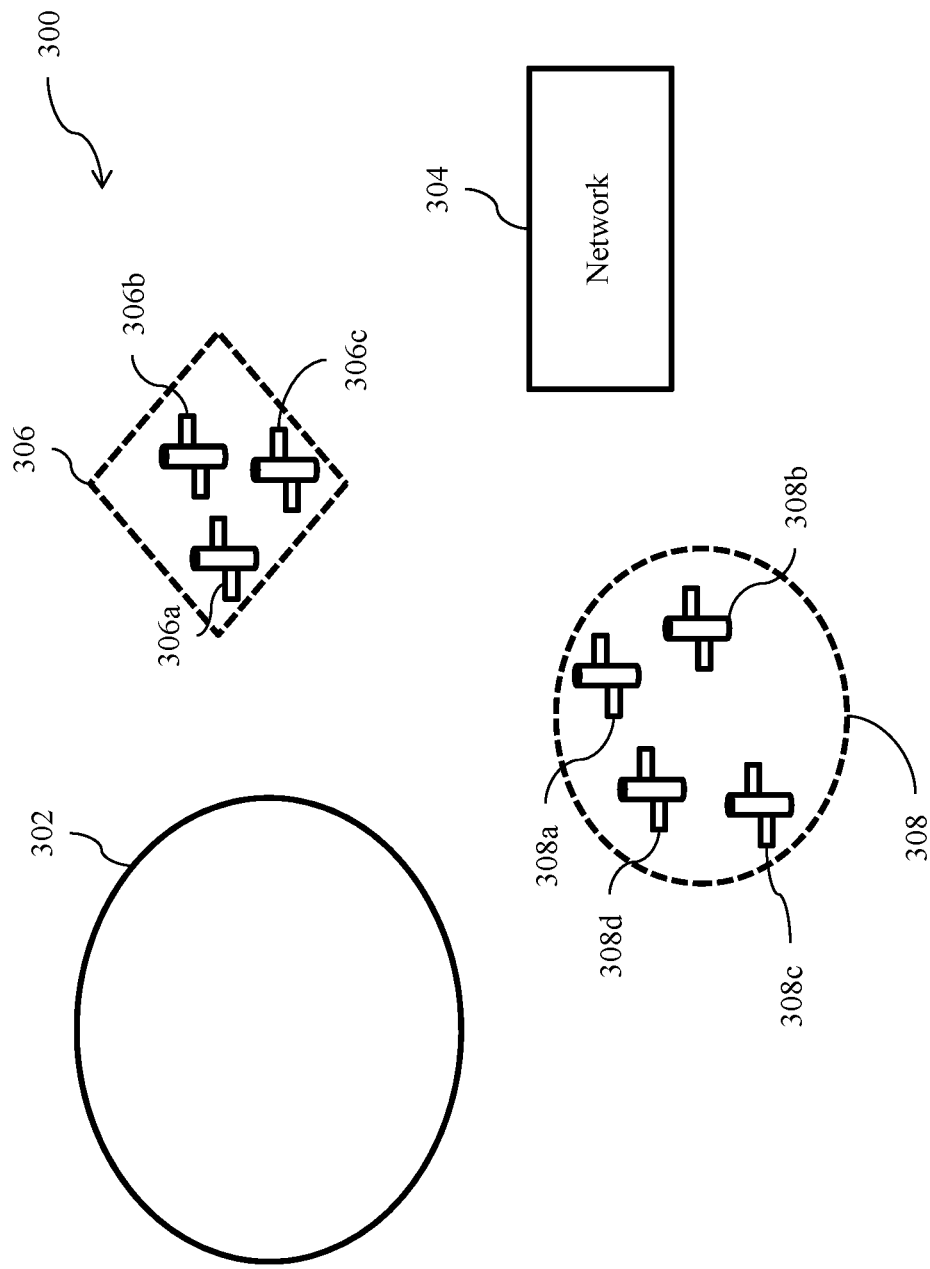
FIG. 3A illustrates an exemplary scenario showing a plurality of constellations around earth, according to some embodiments of the present disclosure.

FIG. 3A illustrates an exemplary scenario 300 showing a plurality of constellations 306 and 308 around earth 302, according to some embodiments of the present disclosure. As used herein, 'constellation' may correspond to a group of satellites. Thereby, each of the plurality of constellations 306 and 308 may include a plurality of satellites revolving around the earth 302. For instance, the constellation 306 may include a plurality of satellites 306a, 306b, and 306c. For instance, the constellation 308 may include a plurality of satellites 308a, 308b, 308c, and 308d. Here for purpose of explanation, two constellations 306 and 308 are considered. However, there may be any finite number of constellations around the earth 302.

According to an embodiment, each satellite in each of the plurality of constellations 306 and 308 is configured to implement the protocol (i.e., the protocol 210e) that is executed by a network 304. Thereby, the distributed satellite position verification system may be virtually created such that each satellite is a member of the distributed satellite position verification system along with the network 304. In an embodiment, the network 304 may correspond to the network 208. In this example embodiment, the network 304 may be the distributed network that is configured to execute the protocol. The network 304 may be formed by constellation operators of the constellations 306 and 308 or satellite operators associated each satellite of the plurality of constellations 306 and 308. In an alternate embodiment, the network 304 may be a centralized network that is configured to execute the protocol. In this example embodiment, the network 304 may be formed by a central server or the like that at least includes a processor and a memory to execute the protocol. In a preferred embodiment, the network 304 is the distributed network, because when the network 304 is distributed, the network 304 improves robustness of satellite positioning. For instance, distribution of computation may indicate that unfair advantages given to favored satellites are avoided. For example, the unfair advantages may be considering the positions reported by favored satellites are accurate even if they are not accurate. Furthermore, distribution of computation generally improves robustness due to redundancy in computation. Further, when the network 304 is a distributed network, the network 304 provides an advantage of scalability. For instance, even if the number of the satellites is increased in the air space, this may not significantly affect the distributed network because, in the distributed network, computational power increases proportionally with the number of participants.

According to the protocol, the network 304 is configured to issue a challenge to different satellites in different constellations at regular intervals. As a part of issuing the challenge, the network 304 may be configured to identify at least three satellites. The at least three satellites may include a first verifier satellite (also referred to as a first satellite $i_+$), a target satellite (also referred to as a second satellite $i_0$), and a second verifier satellite (also referred to as a third satellite $i_-$). In an example embodiment, the network 304 may identify the first satellite, the second satellite, and the third satellite such that the second satellite is associated with a constellation different from a constellation of the first satellite and the third satellite. For purpose of explanation, the second satellite, the first satellite, and the third satellite identified by the network 304 are considered to be the satellite 306c, the satellite 308a, and the satellite 308b, respectively. Hereinafter, the satellite 306c may be referred to as the second satellite 306c. The second satellite 306c may correspond to the second satellite 204. Hereinafter, the satellite 308a and the satellite 308b may be referred to as the first satellite 308a and the third satellite 308b, respectively. The first satellite 308a and the third satellite 308b may correspond to the first satellite 202 and the third satellite 206.

Further, in an example embodiment, the network 304 may identify the first satellite 308a and the third satellite 308b such that the first satellite 308a and the third satellite 308b are within a line of sight (LOS) of the second satellite 306c. According to an embodiment, the first satellite 308a and the third satellite 308b are within LOS of the second satellite 306c, if a first chord connecting the second satellite 306c and the first satellite 308a and a second chord connecting the second satellite 306c and the third satellite 308b are not passing through the earth 302. For instance, the first satellite 308a and the third satellite 308b are within LOS of the second satellite 306c, if a length of a vector sum of an inertial position $x_k^{i_0}$ of the second satellite 306c and inertial positions $x_k^{i_\pm}$ of the first satellite 308a and the third satellite 308b are greater than twice a radius $r_E$ of the earth 302, which is mathematically represented as:

$$\|x_k^{i_0} + x_k^{i_\pm}\| > 2r_E.$$

Furthermore, in an example embodiment, the network 304 may be configured to identify the first satellite 308a, the second satellite 306c, and the third satellite 308b, based on the trust score associated with each of the first satellite 308a, the second satellite 306c, and the third satellite 308b. In a preferred embodiment, the network 304 may be configured to identify the first satellite 308a, the second satellite 306c, and the third satellite 308b such that the second satellite 306c is associated with a low trust score (e.g., a trust score below the trust score level) and the first satellite 308a and the third satellite 308b are associated with a high trust score (e.g., a trust score above the trust score level).

Once the first satellite 308a, the second satellite 306c, and the third satellite 308b are identified, the network 304 may enable the first satellite 308a, the second satellite 306c, and the third satellite 308b to participate in a telemetric exchange. As used herein, the telemetric exchange may correspond to exchange of a plurality of radio signals between the first satellite 308a, the second satellite 306c, and the third satellite 308b. For instance, the first satellite 308a, the second satellite 306c, and the third satellite 308b participate in the telemetric exchange as explained in the detailed description of FIG. 3B.

Figure 3B:
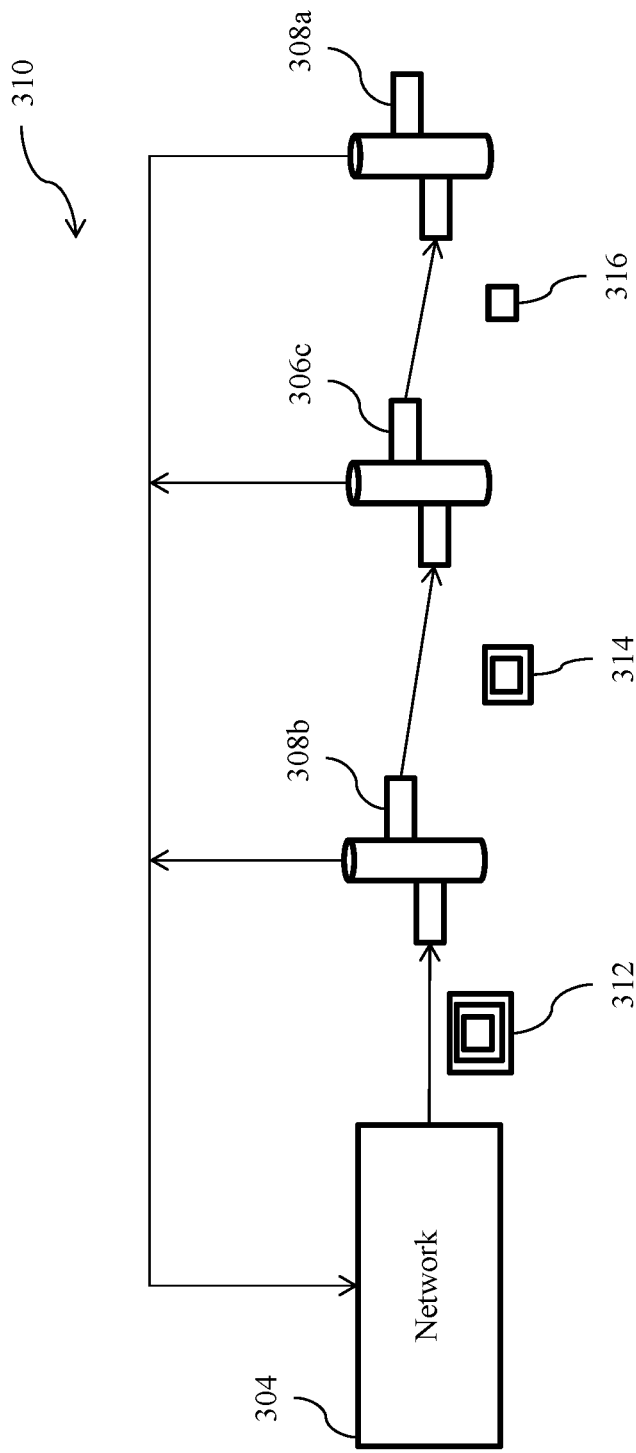
FIG. 3B illustrates an exemplary scenario showing a first satellite, a second satellite, and a third satellite participating in a telemetric exchange, according to some embodiments of the present disclosure

FIG. 3B illustrates an exemplary scenario 310 showing the first satellite 308a, the second satellite 306c, and the third satellite 308b participating in the telemetric exchange, according to some embodiments of the present disclosure. According to an embodiment, to participate in the telemetric exchange, the first satellite 308a, the second satellite 306c, and the third satellite 308b are configured to exchange the plurality of radio signals in a predefined order. According to some embodiments, to ensure the predefined order, the network 304 is configured to transmit (or broadcast) a radio signal as a three-layered encrypted message 312. In an embodiment, the three-layered encrypted message may be formed by the network 304. For example, the network 304 may form the three-layered encrypted message 312 as explained in the detailed description of FIG. 3C.

Figure 3C:
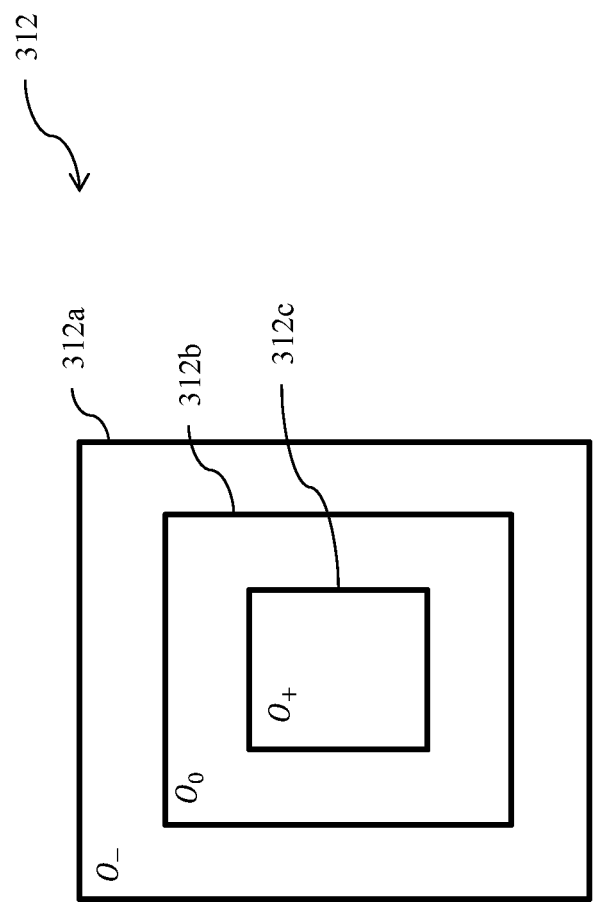
FIG. 3C illustrates a three-layered encrypted message, according to some embodiments of the present disclosure.

FIG. 3C illustrates the three-layered encrypted message 312, according to some embodiments of the present disclosure. According to an embodiment, the network 304 may form the three-layered encrypted message 312 such that an outer layer 312a can be decrypted by the third satellite 308b, a middle layer 312b can be decrypted by the second satellite 306c, and an inner layer 312c can be decrypted by the first satellite 308a. For instance, the three layers (the outer layer 312a, the middle layer 312b, and the inner layer 312c) may be mathematically represented as:

$$O_b \triangleq E_{\check{s}k_b}(v_b, \tau_b, O_{b++}), \text{ and } b \in \{-, 0, +\} \quad \text{equation (4)}$$

where the notation $O_{b++}$ indicates empty, the notation $E_{\check{s}k_b}$ is an encryption function, encrypted with a shared key $\check{s}k_b$, the notation $v_b \triangleq E_{pk_b}(N_b)$ is the encryption of a nonce $N_b$ corresponding to the satellite $i_b$, encrypted with its public key $pk_b$, and the notation $\tau_b$ (for instance, $\tau_b \approx t_c^{i_-}$) is a time at which the challenge is first supposed to be executed. For example, the encryption and decryption may be performed by using Elliptic-Curve Diffie-Hellman (ECDH) key algorithm.

Referring back to FIG. 3B, once the third satellite 308b receives the three-layered encrypted message 312, the third satellite 308b may perform the third operation. According to an embodiment, when the third satellite 308b performs the third operation, the third satellite 308b may be configured to decrypt the three-layered encrypted message 312 to identify the time $t_c^{i_-}$ and to obtain a two-layered encrypted message 314. For example, the two-layered encrypted message 314 may include the middle layer 312b and the inner layer 312c. Further, the third satellite 308b may generate, at time $t_c^{i_-}$, a record corresponding to its position (e.g., an estimated position $y_c^{i_-}$) and transmit (broadcast) the estimated position and the time ($y_c^{i_-}$, $t_c^{i_-}$) along with the two-layered encrypted message 314.

Once the second satellite 306c receives the two-layered encrypted message 314, the second satellite 306c may perform the second operation. According to an embodiment, when the second satellite 306c performs the second operation, the second satellite 306c may generate a record corresponding to its position (e.g., an estimated position $\hat{y}_c^{i_0}$) and time ($\hat{t}_c^{i_0}$) and may record a signal strength $\hat{m}_0$. Further, the second satellite 306c may decrypt the two-layered encrypted message 314 to obtain a single-layered encrypted message 316. For example, the single-layered encrypted message 316 may correspond to the inner layer 312c. After decrypting, the second satellite 306c may further generate a record corresponding to its position (e.g., an estimated position $y_c^{i_0}$) and time ($t_c^{i_0}$) and may transmit the single-layered message 316 along with ($\hat{y}_c^{i_0}$, $\hat{t}_c^{i_0}$), ($y_c^{i_0}$, $t_c^{i_0}$), and $\hat{m}_0$.

Once the first satellite 308a receives the single-layered message 316, the first satellite 308a may perform the first operation. According to an embodiment, when the first satellite 308a performs the first operation, the first satellite 308a may be configured to generate a record corresponding to its position (e.g., an estimated position $\hat{y}_c^{i_+}$) and time ($\hat{t}_c^{i_+}$) and record a signal strength $\hat{m}_+$. Further, the first satellite 308a may decrypt the single-layered message 316. Furthermore, the first satellite 308a may verify records of positions of the one or more other satellites by performing a verification prescribed by the protocol. In preferred embodiments, the first satellite 308a may verify at least some positions in records of the positions of the second satellite 306c by performing the verification prescribed by the protocol. In some other embodiments, the first satellite 308a may be configured to transmit to the network 304, the position and time ($\hat{y}_c^{i_0}$, $\hat{t}_c^{i_0}$) associated with the first satellite 308a along with the signal strength $\hat{m}_+$, as a part of the first operation. In these embodiments, the network 304 may be configured to verify at least some positions in records of the positions of the second satellite 306c by performing the verification prescribed by the protocol. For instance, the verification prescribed by the protocol is as explained in the detailed description of FIG. 3D.

Figure 3D:
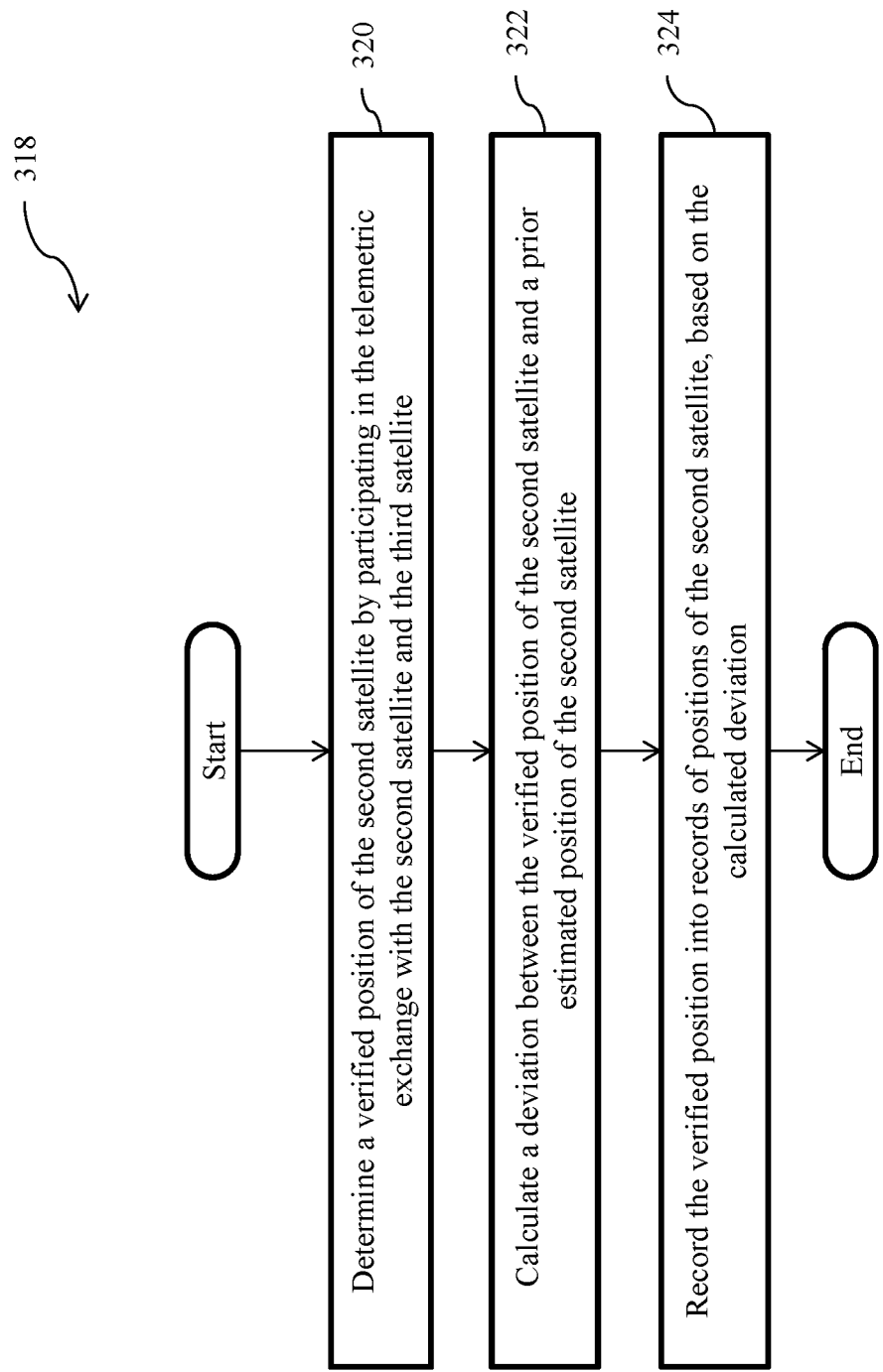
FIG. 3D illustrates a flowchart showing a verification prescribed by a protocol, according to some embodiments of the present disclosure.

FIG. 3D illustrates a flowchart showing the verification 318 prescribed by the protocol, according to some embodiments of the present disclosure. FIG. 3D is explained in conjunction with FIG. 3B. Starting at step 320, the first satellite 308a is configured to determine a verified position of the second satellite 306c by participating in the telemetric exchange with the second satellite 306c and the third satellite 308b. For instance, the participation of the first satellite 308a in the telemetric exchange is as explained in the detailed description of FIG. 3B. According to an embodiment, in response to participating in the telemetric exchange with the second satellite 306c, and the third satellite 308b, the first satellite 308a may determine the verified position of the second satellite 308a. In another embodiment, in response to enabling the first satellite 308a, the second satellite 306c, and the third satellite 308b to participate in the telemetric exchange, the network 304 may determine the verified position of the second satellite 306c. According to an embodiment, the verified position of the second satellite 306c may be the posterior estimate $x_{k+1}^{i_0}$ of the second satellite 306c. For instance, the first satellite 308a (or the network 304) may determine the verified position $x_{k+1}^{i_0}$ of the second satellite 306c as explained in the detailed description of FIG. 3E.

Figure 3E:
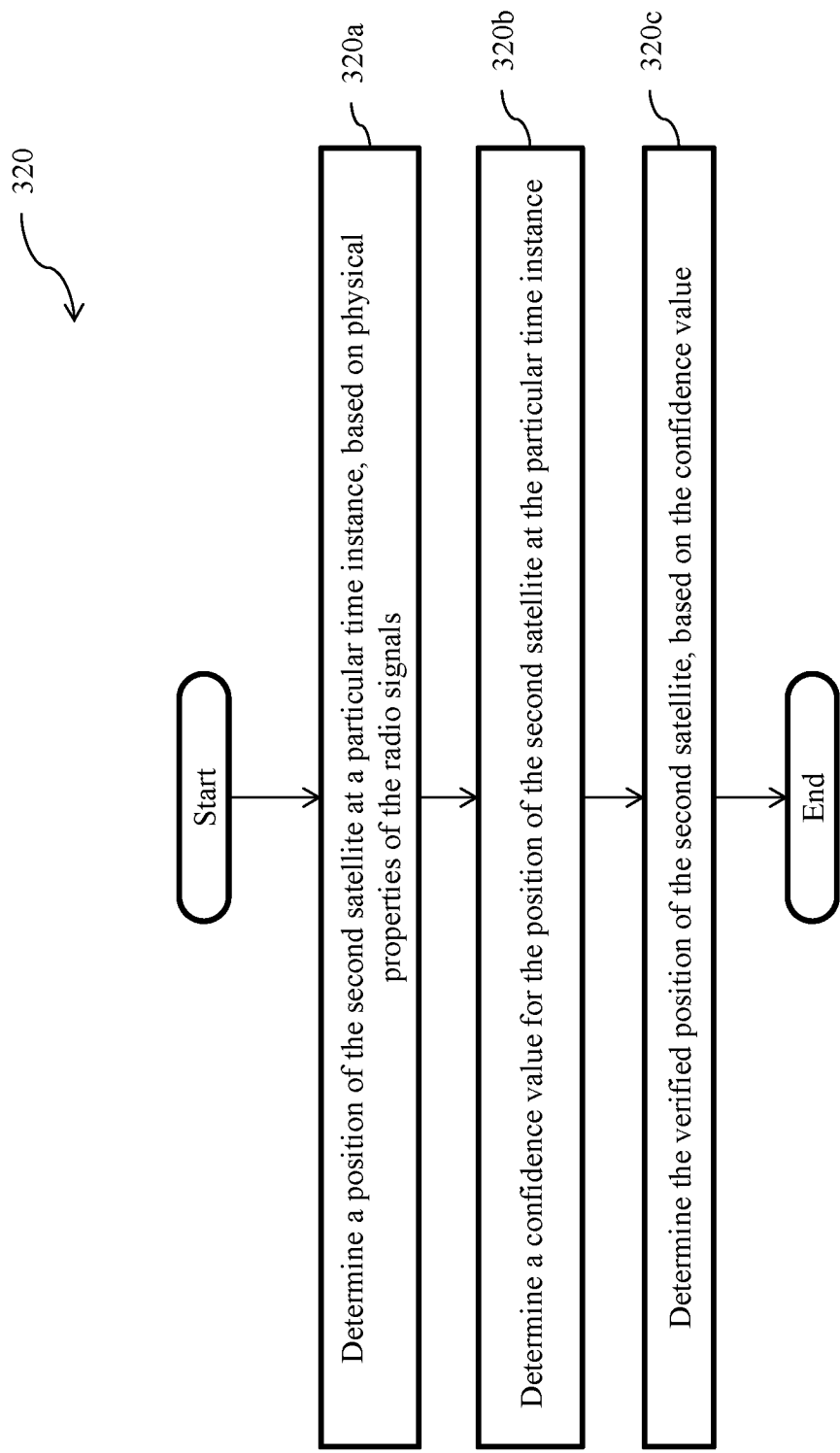
FIG. 3E illustrates a flowchart for determining a verified position of the second satellite, according to some embodiments of the present disclosure.

FIG. 3E illustrates a flowchart for determining the verified position $x_{k+1}^{i_0}$ of the second satellite 306c, according to some embodiments of the present disclosure. FIG. 3E is explained in conjunction with FIG. 3B. Some embodiments are based on the realization that the position and time ($y_c^{i-}$, $t_c^{i-}$) reported by the third satellite 308b, the position and time ($\hat{y}_c^{i+}$, $\hat{t}_c^{i+}$) of the first satellite 308a, the signal strength $\hat{m}_+$ recorded by the first satellite 308a are truthful, because the first satellite 308a and the third satellite 308b are associated with the high trust score. Conversely, the position and time ($\hat{y}_c^{i_0}$, $\hat{t}_c^{i_0}$), the position and time ($y_c^{i_0}$, $t_c^{i_0}$), and the signal strength $\hat{m}_0$ to reported by the second satellite 306c are not truthful, since the second satellite 306c is associated with the low trust score.

To this end, at step 320a, the first satellite 308a (or the network 304) is further configured to determine a position of the second satellite 306c at a particular time instance, based on physical properties of the plurality of radio signals that were exchanged during the telemetric exchange. According to an embodiment, the first satellite 308a may determine the position $y_c^{i_0}$ of the second satellite 306c at the time instance $t_c^{i_0}$ based on the physical properties of the radio signals. For instance, the physical properties such as signal speed and signal strength of the radio signals may be used to determine the position $y_c^{i_0}$ of the second satellite 306c at the time instance $t_c^{i_0}$. In vacuum space, the signal speed of the radio signals is equal to a speed of light c and the signal strength decays as an inverse square function of distance. Accordingly, the signal speed may be mathematically represented as:

$$\|\hat{y}_c^{i_0} - y_c^{i-}\| \approx c|\hat{t}_c^{i_0} - t_c^{i-}|, \text{ and } \|\hat{y}_c^{i+} - y_c^{i_0}\| \approx c|\hat{t}_c^{i+} - t_c^{i_0}| \quad \text{equation (5)}.$$

Further, the signal strength may be mathematically represented as:

$$\frac{\hat{m}_0}{\|\hat{y}_c^{i_0} - y_c^{i-}\|^2} \approx \frac{m_*}{d_*^2}, \text{ and } \frac{\hat{m}_+}{\|\hat{y}_c^{i+} - y_c^{i_0}\|^2} \approx \frac{m_*}{d_*^2} \quad \text{equation (6)}$$

where the notation $m_*$ is the signal strength, which is empirically determined at a distance $d_*$.

The equations (5) and (6) includes four equations and nine variables $\hat{y}_c^{i_0}$, $y_c^{i_0}$, $\hat{t}_c^{i_0}$, $t_c^{i_0}$, and $\hat{m}_0$. For instance, each of the positions $\hat{y}_c^{i_0}$ and $y_c^{i_0}$ includes three variables, as each of the positions $\hat{y}_c^{i_0}$ and $y_c^{i_0}$ represents a three-dimensional position of the second satellite 306c. Thereby, the equations (5) and (6) are under-determined by five equations. To reduce the number of variables, considering that the second satellite 306c transmits the single-layered encrypted message 316 soon after receiving the two-layered encrypted message 314, so that, $$\hat{y}_c^{i_0} \approx y_c^{i_0}, \text{ and } \hat{t}_c^{i_0} \approx t_c^{i_0} \quad \text{equation (7)}.$$

By substituting the equation (7) in the equations (5) and (6), the number of variables in the equations (5) and (6) may be reduced to five variables. In other words, the equations (5) and (6) are under-determined by one equation, even after substituting the equation (7) in the equations (5) and (6).

To this end, the first satellite 308a (or the network 304) may identify at least one observer satellite (also referred to as at least one witness satellite $i_w$). Some embodiments are based on the recognition that any satellite (excluding the first satellite 308a, the second satellite 306c, and the third satellite 308b) that is within the LOS of the second satellite 306c can help in the verification of the second satellite 306c. Thereby, the first satellite 308a may identify the at least one observer satellite such that the at least one observer satellite is within the LOS of the second satellite 306c. For instance, the at least one observer satellite identified by the first satellite 308a is considered to be the satellite 306a that is within the LOS of the second satellite 306c. Hereinafter, the satellite 306a may be referred to as the observer satellite 306a (or the witness satellite $i_w$). According to the protocol (i.e., the protocol 210e), once the observer satellite 306a receives the single-encrypted message 316 from the second satellite 306c, the observer satellite 306a may be configured to perform an observation function. When the observation satellite 306c performs the observation function, the observer satellite 306a may be configured to generate a record corresponds to its position (e.g., an estimated position $\hat{y}_c^{i_w}$) and time ($\hat{t}_c^{i_w}$) and record signal strength $\hat{m}_w$ to provide two additional equations as follows:

$$\|\hat{y}_c^{i_w} - y_c^{i_0}\| \approx c|\hat{t}_c^{i_w} - t_c^{i_0}|, \text{ and } \frac{\hat{m}_w}{\|\hat{y}_c^{i_w} - y_c^{i_0}\|^2} \approx \frac{m_*}{d_*^2}. \quad \text{equation (8)}$$

Using the equations (5), (6), (7), and (8), the first satellite 308a (or the network 304) may determine the position and time ($y_c^{i_0}$, $t_c^{i_0}$) of the second satellite 306c.

At step 320b, the first satellite 308a (or the network 304) may determine a confidence value for the position $y_c^{i_0}$ at the particular time instance $t_c^{i_0}$. According to an embodiment, the first satellite 308a may determine the confidence value for the position and time $(y_c^{i_0}, t_c^{i_0})$ as a weighted mean-square error. For instance, the confidence value may be mathematically determined as follows:

$$\Gamma = q_d(e_d^2 + q_w e_{w,d}^2) + q_s(e_s^2 + q_w e_{w,s}^2) \quad \text{equation (9)}$$

where the notation $e_d^2 = \Sigma_{b=-,0}$
$(\|\hat{y}_c^{i_{b+1}} - y_c^{i_b}\|^2 - c^2|\hat{t}_c^{i_{b+1}} - t_c^{i_b}|^2)^2$,
the notation $e_s^2 = \Sigma_{b=-,0}(\hat{m}_{b++} d_*^2 - m_* \|\hat{y}_c^{i_{b+1}} - y_c^{i_b}\|^2)^2$,
the notation $$e_{w,d}^2 = \frac{1}{|W|} \sum_{w \in W} \left( \left\| \hat{y}_c^{iw} - y_c^{i_0} \right\|^2 - c^2 \left| \hat{t}_c^{iw} - t_c^{i_0} \right|^2 \right)^2,$$

the notation $$e_{w,s}^2 = \frac{1}{|W|} \sum_{w \in W} \left( \hat{m}_w d_*^2 - m_* \|\hat{y}_c^{iw} - y_c^{i_0}\|^2 \right)^2,$$

and $q_d$, $q_s$, and $q_w$ are weights and W is a set of the at least one observer satellite.

At step 320c, the first satellite 308a (or the network 304) may determine the verified position $x_{k+1}^{i_0}$ of the second satellite 306c, based on the confidence value $\Gamma$. According to an embodiment, the first satellite 308a may compare the confidence value $\Gamma$ with a predetermined confidence bound $\Gamma^*$ to identify a status of the determined position $y_c^{i_0}$ as at least one of a self-reported verified position and a self-reported unverifiable position. If the confidence value $\Gamma$ is within the predetermined confidence bound $\Gamma^*$, the first satellite 308a may identify the status of the determined position $y_c^{i_0}$ as the self-reported verified position. If the confidence value $\Gamma$ is not within the predetermined confidence bound $\Gamma^*$, the first satellite 308a may identify the status of the determined position $y_c^{i_0}$ as the self-reported unverifiable position. According to protocol, the status to be identified may further include at least one of a self-reported not verified position and an unreported position. In an example embodiment, the first satellite 308a may identify the status as the unreported position, if the second satellite 306c fails to report the position and time $(y_c^{i_0}, t_c^{i_0})$. Further, the first satellite 308a may identify the status as the self-reported unverified position, when the first satellite 308a, the third satellite 308b, and/or the observer satellite 306a fail to report their corresponding position and time.

If the status is identified as the self-reported verified position, the first satellite 308a (or the network 304) may determine the verified position $x_{k+1}^{i_0}$ as follows:
$x_{k+1}^{i_0} = \check{x}_{k+1}^{i_0}$, where according to a weighted center difference formula, $\check{x}_{k+1}^{i_0} \triangleq$ $$\left( \frac{2}{1+\delta} - \frac{(1-\delta)h^2 \mu}{\|y_c^{i_0}\|^3} \right) X - \frac{1-\delta}{1+\delta} x_{k-1}^{i_0},$$

the notation $X = y_c^{i_0}$, the notation $\delta = (t_c^{i_0} - t_k)/h$, and the notation $t_c^{i_0} \in (t_k^{i_0}, t_{k+1}^{i_0})$.

If the status is identified as the self-reported unverified position, the first satellite 308a (or the network 304) may determine the verified position $x_{k+1}^{i_0}$ as follows:

$x_{k+1}^{i_0} = \check{x}_{k+1}^{i_0}$, where according to the weighted center difference formula, $\check{x}_{k+1}^{i_0} \triangleq$ $$\left( \frac{2}{1+\delta} - \frac{(1-\delta)h^2 \mu}{\|y_c^{i_0}\|^3} \right) X - \frac{1-\delta}{1+\delta} x_{k-1}^{i_0},$$

the notation $X = \bar{x}_{k+1}^{i_0}$, the notation $\delta = (\bar{t}^{i_0} - t_k)/h$, the notation $\bar{x}_{k+1}^{i_0}$ is a self-reported position from the second satellite 306c at a time $\bar{t}^{i_0}$.

If the status is identified as at least one of the unreported position or the self-reported unverifiable position, the first satellite 308a (or the network 304) may determine the verified position $x_{k+1}^{i_0}$ as follows:
$x_{k+1}^{i_0} = \hat{x}_{k+1}^{i_0}$, where the notation $\hat{x}_{k+1}^{i_0}$ is the prior estimated position of the second satellite 306c. For instance, the prior estimated position of the second satellite 306c may be mathematically determined by the dynamics of the second satellite 306c. For example, the prior estimated position of the second satellite 306c may be mathematically determined as:

$$\hat{x}_{k+1}^{i_0} \triangleq \left( 2 - \frac{h^2 \mu}{\|x_k^{i_0}\|^3} \right) x_k^{i_0} - x_{k-1}^{i_0}$$

where the notation $x_k^{i_0}$ is the posterior estimated position (or the verified position) of the second satellite 306c at time $t_k$, the notation $x_{k-1}^{i_0}$ is the posterior estimated position (or the verified position) of the second satellite 306c at time $t_{k-1}$, and the notation $h = t_{k+1} - t_k$. For instance, the posterior estimated positon $x_k^{i_0}$ at time $t_k$ and the posterior estimated position $x_{k-1}^{i_0}$ at time $t_{k-1}$ may be determined by the protocol (i.e., the protocol 210e), similarly as explained in regard to the posterior estimate $x_{k+1}^{i_0}$ at time $t_{k+1}$.

Referring back to FIG. 3D, once the verified position $x_{k+1}^{i_0}$ is determined, the verification 318 prescribed by the protocol continues with step 322. At step 322, the first satellite 308a (or the network 304) may calculate a deviation between the verified position $x_{k+1}^{i_0}$ of the second satellite 306c and the prior estimated position $\hat{x}_{k+1}^{i_0}$ of the second satellite 306c. According to an embodiment, the first satellite 308a may calculate a Euclidean distance between the verified position $x_{k+1}^{i_0}$ and the prior estimated position $\hat{x}_{k+1}^{i_0}$ to calculate the deviation. Thereby, the calculated deviation is the Euclidean distance between the verified position $x_{k+1}^{i_0}$ and the prior estimated position $\hat{x}_{k+1}^{i_0}$. For instance, the first satellite 308a may mathematically calculate the deviation as follows:

$$d_{k+1}^{i_0} = d(x_{k+1}^{i_0}, \hat{x}_{k+1}^{i_0}) = \|x_{k+1}^{i_0} - \hat{x}_{k+1}^{i_0}\|.$$

At step 324, the first satellite 308a (or the network 304) may record the verified position $x_{k+1}^{i_0}$ into the records of the positions of the second satellite 306c, based on the calculated deviation. According to an embodiment, to record the verified position $x_{k+1}^{i_0}$, the first satellite 308a may compare the calculated deviation $d_{k+1}^{i_0}$ with a predefined deviation bound D*. Further, the first satellite 308a may record the verified position $x_{k+1}^{i_0}$ into the records of the positions of the second satellite 306c, when the calculated deviation $d_{k+1}^{i_0}$ is within (or not greater than) the predefined deviation bound D*. If the calculated deviation $d_{k+1}^{i_0}$ is not within the predefined deviation bound D*, the first satellite 308a (or the network 304) may not record the verified position $x_{k+1}^{i_0}$ into the records of the positions of the second satellite 306c. For instance, the records of the positions of the second satellite 306c may be as illustrated in FIG. 4A.

Figure 4A:
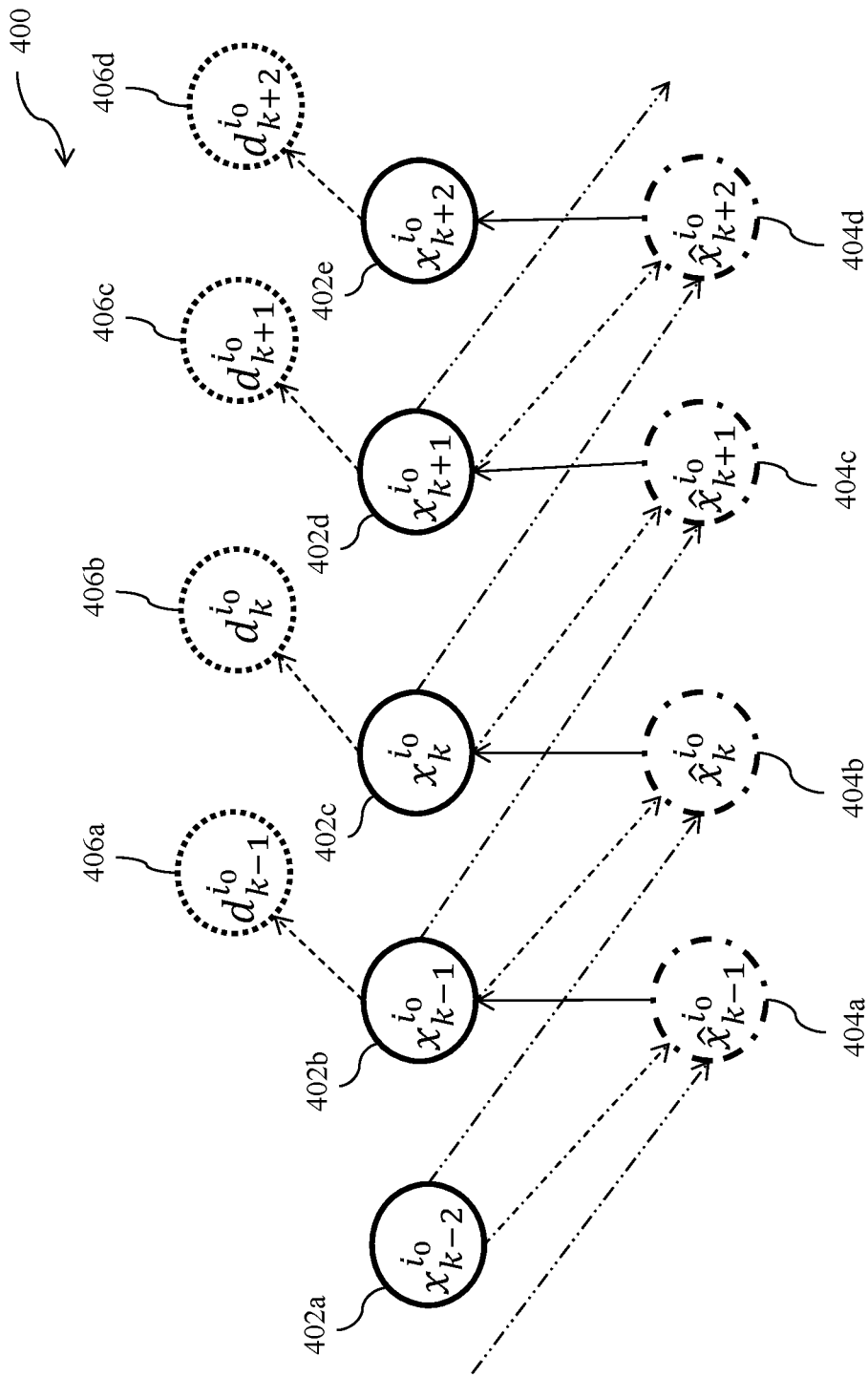
FIG. 4A illustrates a schematic showing records of positions of the second satellite, according to some embodiments of the present disclosure.

FIG. 4A illustrates a schematic 400 showing the records of the positions of the second satellite 306c, according to some embodiments of the present disclosure. FIG. 4A is explained in conjunction with FIG. 3A-FIG. 3E. According to an embodiment, the records of the positions of the second satellite 306c may include a first record comprising a plurality of verified positions 402a, 402b, 402c, 402d, and 402e (also referred to as a plurality of posterior estimated positions 402a, 402b, 402c, 402d, and 402e) and a second record comprising a plurality of prior estimated positions 404a, 404b, 404c, and 404d. Additionally, the records of the positions of the second satellite 306c may include a plurality of deviations 406a, 406b, 406c, and 406d. According to the protocol (i.e., the protocol 210e), the prior estimated position may be formulated by using two previously verified positions. For instance, the first satellite 308a may formulate the prior estimated position 404c (i.e., the prior estimated position $\hat{x}_{k+1}^{i_0}$) by using the previously verified positions 402c and 402b (i.e., the verified positions $x_k^{i_0}$ and $x_{k-1}^{i_0}$).

According to the protocol, the verified position may be recorded into the first record by calculating the deviation between the verified position and the prior estimated position. For instance, the first satellite 308a may record the verified position 402d (i.e., the verified position $x_{k+1}^{i_0}$) into the first record, when the deviation 406c (i.e., the deviation $d_{k+1}^{i_0}$) between the verified position 402d and the prior estimated position 404c is within the predefined deviation bound. According to the protocol, the network 304 may be further configured to reduce, by a predefined factor, the trust score associated with the second satellite 306c, if the deviation is greater than the predefined deviation bound. Conversely, the network 304 may be further configured to increase, by a predefined factor, the trust score associated with the second satellite 306c, if the deviation is not greater than the predefined deviation bound.

Here for the purpose of explanation, the first satellite 308a determining the verified position 402d at time $t_{k+1}$; and recording the verified position 402d into the first record is considered. However, when the protocol is implemented over time by satellites, any satellite acting as the verifier satellite that performs the first operation may determine and record the verified position 402e into the first record in future time, as similarly explained with respect to the verified position 402d.

According to the protocol, since the verified position 402d is determined based on the one of four possibilities: the self-reported verified position, the self-reported unverifiable position, the self-reported unverified position, or the unreported position, the verified position 402d may be overwritten in future time according to an order of preference. For instance, the order of preference for overwriting the verified position may be as explained in the detailed description of FIG. 4B.

Figure 4B:
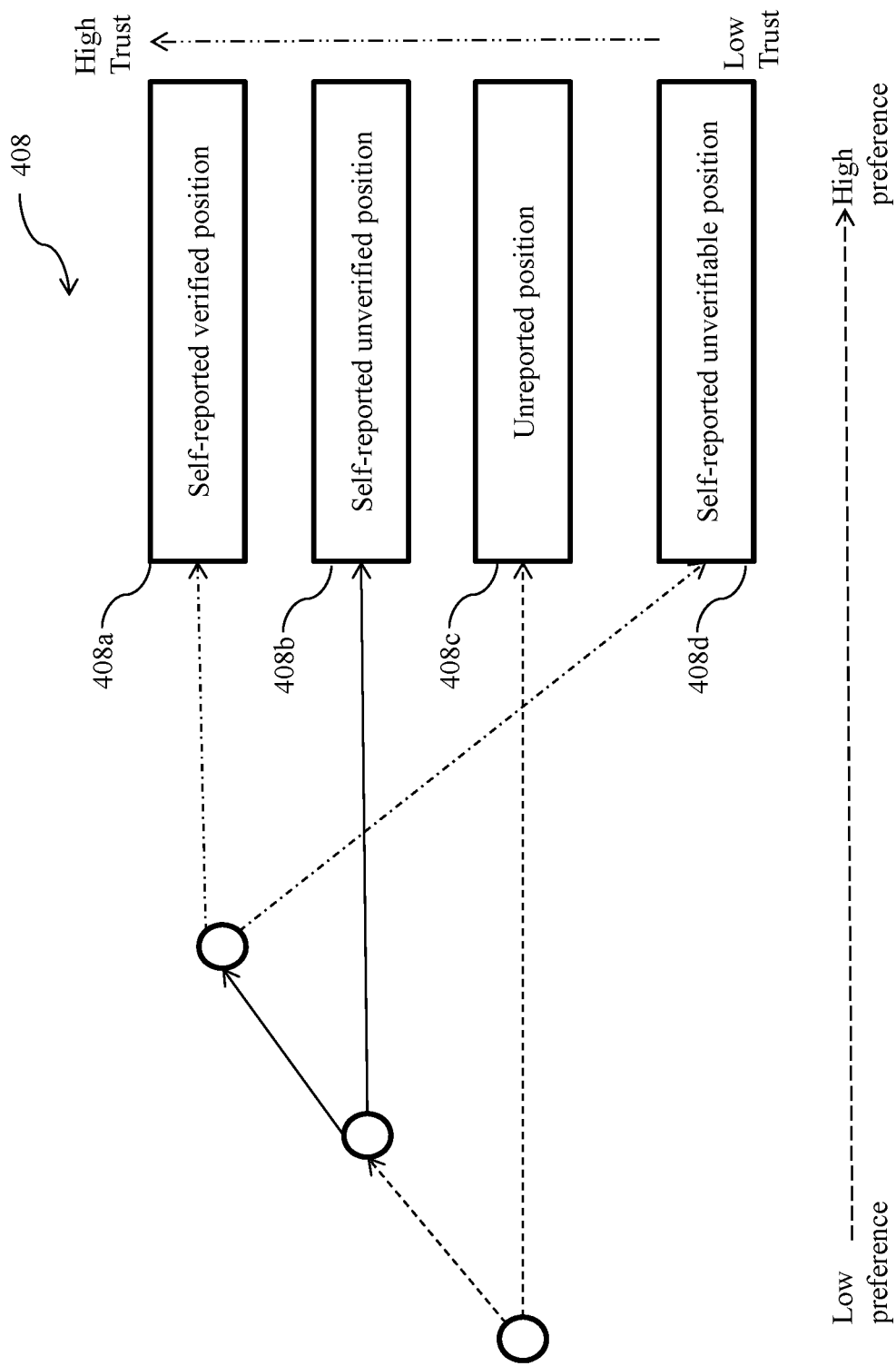
FIG. 4B illustrates a schematic showing an order of preference of various positions of a satellite, according to some embodiments of the present disclosure.

FIG. 4B illustrates a schematic 408 showing an order of preference, according to some embodiments of the present disclosure. As illustrated in the schematic 408, the order of preference of the status is given as:

Self-reported verified position 408a, where the verified position $x_{k+1}^{i_0}=\breve{x}_{k+1}^{i_0}$ with $(X, \delta)=(y_c^{i_0}, (t_c^{i_0}-t_k)/h)$,
Self-reported unverifiable position 408d, where the verified position $x_{k+1}^{i_0}=\hat{x}_{k+1}^{i_0}$,
Self-reported unverified position 408b, where the verified position $x_{k+1}^{i_0}=\breve{x}_{k+1}^{i_0}$ with $(X, \delta)=(\overline{x}_{k+1}^{i_0}, (\overline{t}^{i_0}-t_k)/h)$, and
Unreported position 408c, where the verified position $x_{k+1}^{i_0}=\hat{x}_{k+1}^{i_0}$.

Thereby, even if the verified position $x_{k+1}^{i_0}$ is determined as $x_{k+1}^{i_0}=\hat{x}_{k+1}^{i_0}$ (e.g. the self-reported unverifiable position) in a first instance of time and the verified position $x_{k+1}^{i_0}$ is determined as $x_{k+1}^{i_0}=\breve{x}_{k+1}^{i_0}$ (e.g. the self-reported verified position) in a second instance of time, then the verified position determined in the second instance of time may replace the verified position determined in the first instance of time, where the second instance of time comes after the first instance of time in time t. For instance, the verifier satellite (or the network 304) may replace the verified position determined in the first instance with the verified position determined in the second instance of time. The schematic 408 further illustrates an order of trust, where the self-reported verified position is considered to be the high trust case and the self-reported unverifiable position is considered to be a low trust case.

Figure 5:
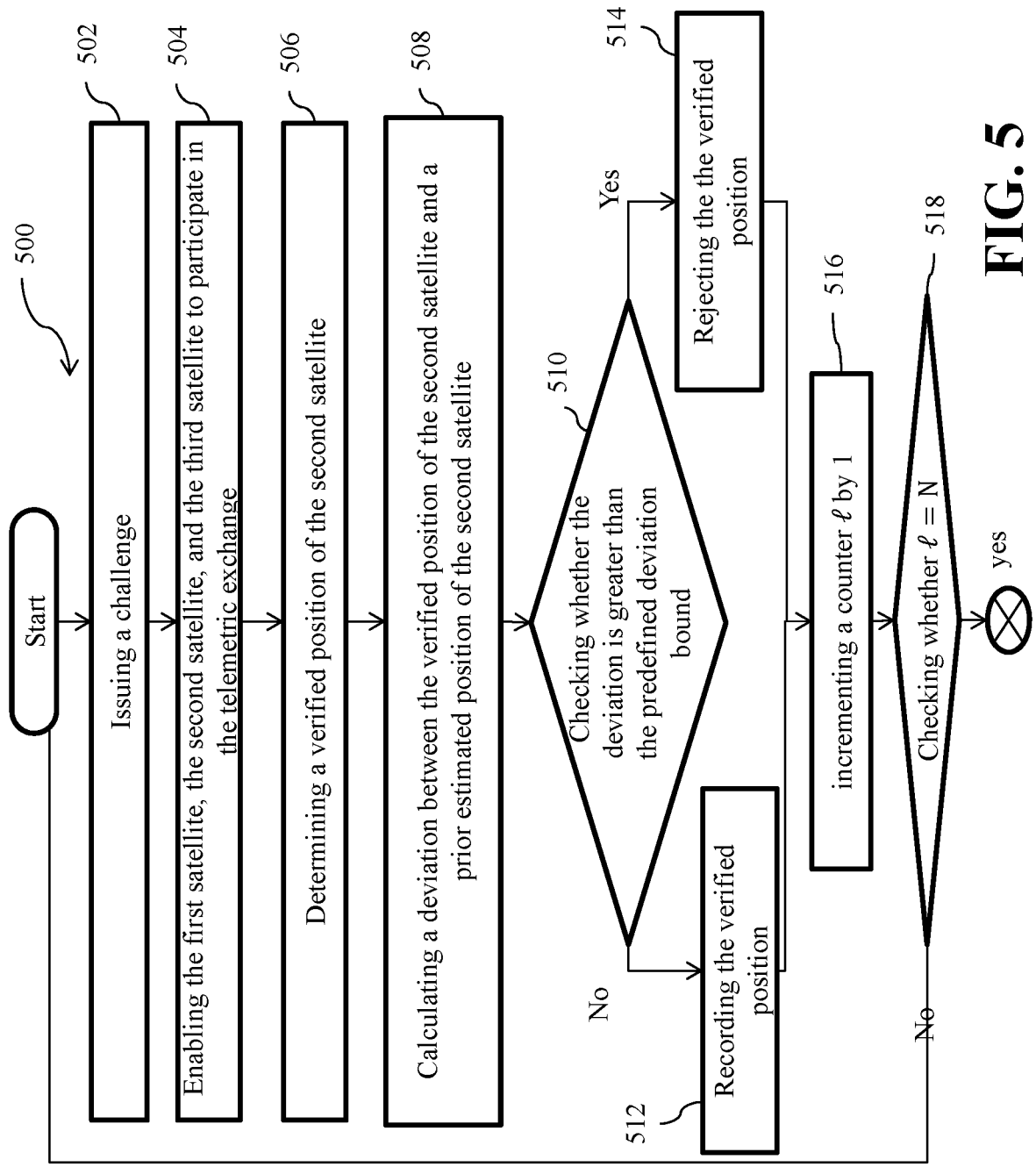
FIG. 5 illustrates a flowchart of a method associated with implementation of the protocol, according to some embodiments of the present disclosure.
Figure 5:
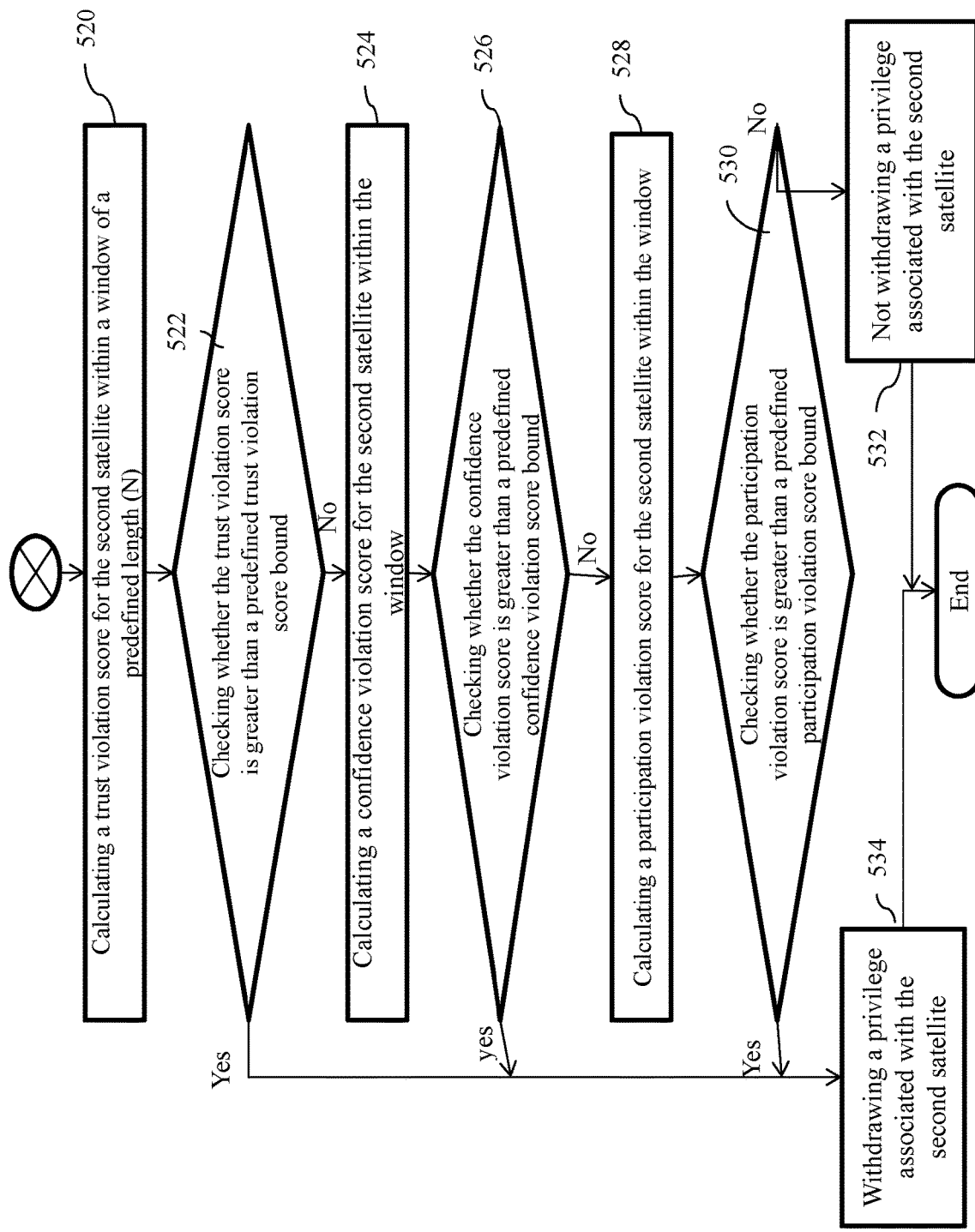

FIG. 5 illustrates a flowchart of a protocol 500, according to some embodiments of the present disclosure. FIG. 5 is explained in conjunction with FIG. 2A-FIG. 4B. Starting at step 502, the protocol 500 may include issuing the challenge. For instance, the network 304 may issue the challenge, as explained in the detailed description of FIG. 3A-3C. At step 504, the protocol 500 may include enabling the first satellite 308a, the second satellite 306c, and the third satellite 308b to participate in the telemetric exchange. For instance, the network 304 may enable the first satellite 308a, the second satellite 306c, and the third satellite 308b to participate in the telemetric exchange, as explained in the detailed description of FIG. 3B.

At step 506, the protocol 500 may include determining the verified position $x_{k+1}^{i_0}$ of the second satellite 306c. For instance, the first satellite 308a (or the network 304) may determine the verified position $x_{k+1}^{i_0}$ of the second satellite 306c as explained in the detailed description of FIG. 3E.

At step 508, the protocol 500 may include calculating the deviation $d_{k+1}^{i_0}$ between the verified position $x_{k+1}^{i_0}$ of the second satellite 306c and the prior estimated position of the second satellite 306c. For instance, the first satellite 308a (or the network 304) may calculate the deviation $d_{k+1}^{i_0}$ between the verified position $x_{k+1}^{i_0}$ of the second satellite 306c and the prior estimated position of the second satellite 306c as explained the detailed description of FIG. 3D.

At step 510, the protocol 500 may include comparing the calculated deviation $d_{k+1}^{i_0}$ with the predefined deviation bound D* to check whether the calculated deviation $d_{k+1}^{i_0}$ is greater than the predefined deviation bound D*. For instance, the first satellite 308a (or the network 304) may compare the calculated deviation $d_{k+1}^{i_0}$ with the predefined deviation bound D*.

If the calculated deviation $d_{k+1}^{i_0}$ is not greater than the predefined deviation bound D*, the protocol 500 may proceed with step 512. At step 512, the protocol 500 may include recording the verified position $x_{k+1}^{i_0}$ of the second satellite 306c into the records of the positions of the second satellite 306c. For instance, the first satellite 308a (or the network 304) may record the verified position $x_{k+1}^{i_0}$ of the second satellite 306c into the records of the positions of the second satellite 306c as explained in the detailed description of FIG. 4A and FIG. 4B.

If the calculated deviation $d_{k+1}^{i_0}$ is greater than the predefined deviation bound D*, the protocol 500 may proceed with step 514. At step 514, the protocol 500 may include rejecting the verified position $x_{k+1}^{i_0}$ of the second satellite 306c. For instance, the first satellite 308a (or the network 304) may reject the verified position $x_{k+1}^{i_0}$ of the second satellite 306c.

At step 516, the protocol 500 may include incrementing a counter value l by one. In an example embodiment, the counter value l is associated with the second satellite 306c.

For instance, the first satellite 308a (or the network 304) may increment the counter value l by one.

At step 518, the protocol 500 may include checking whether the counter value l is equal to a predefined counter value N. For instance, the first satellite 308a (or the network 304) may check whether the counter value l is equal to the predefined counter value N.

If the counter value l is not equal to the predefined counter value N, the protocol 500 may proceed with step 502 to repeat the steps 502-516 until the counter value l is equal to the predefined counter value N. Thereby, N verified positions for the second satellite 306c may be determined, which may represent a window of N verified positions. For instance, by setting the counter value of N, the window of predefined length N verified positions may be obtained.

If the counter value l is equal to the predefined counter value N, the protocol 500 may proceed with step 520. At step 520, the protocol 500 may include calculating a trust violation score $V_{k+N}^{io}$ for the second satellite 306c within the window of the predefined length N. According to an embodiment, the protocol 500 may further comprise operations to withdraw a privilege associated with the second satellite 306c, based on at least one of a trust violation score, a confidence violation score, and a participation violation score. For instance, when the network 304 executes the operations, the network 304 may calculate the trust violation score $V_{k+N}^{io}$ for the second satellite 306c within the window of the predefined length N. For example, the trust violation score $V_{k+N}^{io}$ may be mathematically calculated as follows:

$V_{k+N}^{io} = \Sigma_{l=1}^{N} \#\{d_{k+l}^{io} > D^*\}$. The trust violation score $V_{k+N}^{io}$ may be a trust violation number indicative of number of times the deviation is greater than the predefined deviation bound for the second satellite 306c with the window.

At step 522, the protocol 500 may include comparing the trust violation score $V_{k+N}^{io}$ with the predefined trust violation score bound V* to check whether the trust violation score $V_{k+N}^{io}$ is greater than the predefined trust violation score bound V*. For instance, when the network 304 executes the operations, the network 304 may compare the trust violation score $V_{k+N}^{io}$ with the predefined trust violation score bound V*.

If the trust violation score $V_{k+N}^{io}$ is not greater than the predefined trust violation score bound V*, the protocol 500 may proceed with step 524. At step 524, the protocol 500 may include calculating a confidence violation score $F_{k+N}^{io}$ for the second satellite 306c within the window of the predefined length N. For instance, when the network 304 executes the operations, the network 304 may calculate the confidence violation score $F_{k+N}^{io}$ for the second satellite 306c within the window of the predefined length N. For example, the confidence violation score $F_{k+N}^{io}$ may be mathematically calculated as follows:

$F_{k+N}^{io} = \Sigma_{l=1}^{N} \#\{\Gamma > \Gamma^*\}$. The confidence violation score $F_{k+N}^{io}$ may be a confidence violation number indicative of number of times the confidence value $\Gamma$ is greater than the predefined confidence bound $\Gamma^*$ for the second satellite 306c with the window.

At step 526, the protocol 500 may include comparing the confidence violation score $F_{k+N}^{io}$ with the predefined confidence violation score bound F* to check whether the confidence violation score $F_{k+N}^{io}$ is greater than the predefined confidence violation score bound F*. For instance, when the network 304 executes the operations, the network 304 may compare the confidence violation score $F_{k+N}^{io}$ with the predefined confidence violation score bound F*.

If the confidence violation score $F_{k+N}^{io}$ is not greater than the predefined confidence violation score bound F*, the protocol 500 may proceed with step 528. At step 528, the protocol 500 may include calculating a participation violation score $P_{k+N}^{io}$ for the second satellite 306c within the window of the predefined length N. For instance, when the network 304 executes the operations, the network 304 may calculate the participation violation score $P_{k+N}^{io}$ for the second satellite 306c within the window of the predefined length N. For example, the participation violation score $P_{k+N}^{io}$ may be mathematically calculated as follows: $P_{k+N}^{io} = \Sigma_{l=1}^{N} \#\{DNP\} - a_w \#\{witnessed\}$, where the notation 'DNP' indicates the second satellite 306c failed to participate in the challenge, the notation 'witnessed' indicates the second satellite 306c acting as the observer satellite, the notation $a_w$ (e.g., $a_w \ll 1$) is a weight assigned for acting as the observer satellite. The participation violation score $P_{k+N}^{io}$ may be a difference between the number of times the second satellite 306c failed to participate in the challenge within the window and the weight ($a_w$) multiplied with the number of times the second satellite 306c was identified as the observer satellite within the window.

At step 530, the protocol 500 may include comparing the participation violation score $P_{k+N}^{io}$ with the predefined participation violation score bound P* to check whether the participation violation score $P_{k+N}^{io}$ is greater than the predefined participation violation score bound P*. For instance, when the network 304 executes the operations, the network 304 may compare the participation violation score $P_{k+N}^{io}$ with the predefined participation violation score bound P*.

If the participation violation score $P_{k+N}^{io}$ is not greater than the predefined participation violation score bound P*, the protocol 500 may proceed with step 532. At step 532, the protocol 500 may include not withdrawing the privilege associated with the second satellite 306c. For instance, the network 304 may not withdraw the privilege associated with the second satellite 306c.

If any one of: the trust violation score $V_{k+N}^{io}$ is greater than the predefined trust violation score bound V*; the confidence violation score $F_{k+N}^{io}$ is greater than the predefined confidence violation score bound F*; or the participation violation score $P_{k+N}^{io}$ is greater than the predefined participation violation score bound P*, the protocol 500 may proceed with step 534. At step 534, the protocol 500 may include withdrawing the privilege associated with the second satellite 306c. For instance, when the network 304 executes the operations, the network 304 may withdraw the privilege associated with the second satellite 306c. In an embodiment, when the privilege associated with the second satellite 306c is withdrawn, the second satellite may not be the member of the distributed satellite position verification system 200. In some embodiments, when the privilege associated with the second satellite 306c is withdrawn, the protocol 500 may not allow the second satellite 306c to report its position. As used herein, the privilege may be an indication that can be used to check whether a satellite is a member of the distributed satellite position verification system.

Here for the purpose of explanation, the trust violation score, the confidence violation score, and the participation violation score computed using a single window of predefined length N is considered. However, in some implementations, the trust violation score may be computed using a window of predefined length $N_V$, the confidence violation sore may be computed using a window of predefined length $N_F$, the participation violation score may be computed using a window of predefined length $N_P$, such that each of the predefined values $N_V$, $N_F$, and $N_P$ is different from each other. In these implementations, the counter value N may be set as: N=max ($N_V$, $N_F$, $N_P$), to compute: the trust violation score using the window of predefined length $N_V$; the confidence violation sore using the window of predefined length $N_F$; the participation violation score using the window of predefined length $N_P$.

In some example embodiments, the protocol 500 may be implemented using block chain technology. For instance, the protocol 500 implemented using the block chain technology as explained in the detailed description of FIG. 6.

Figure 6:
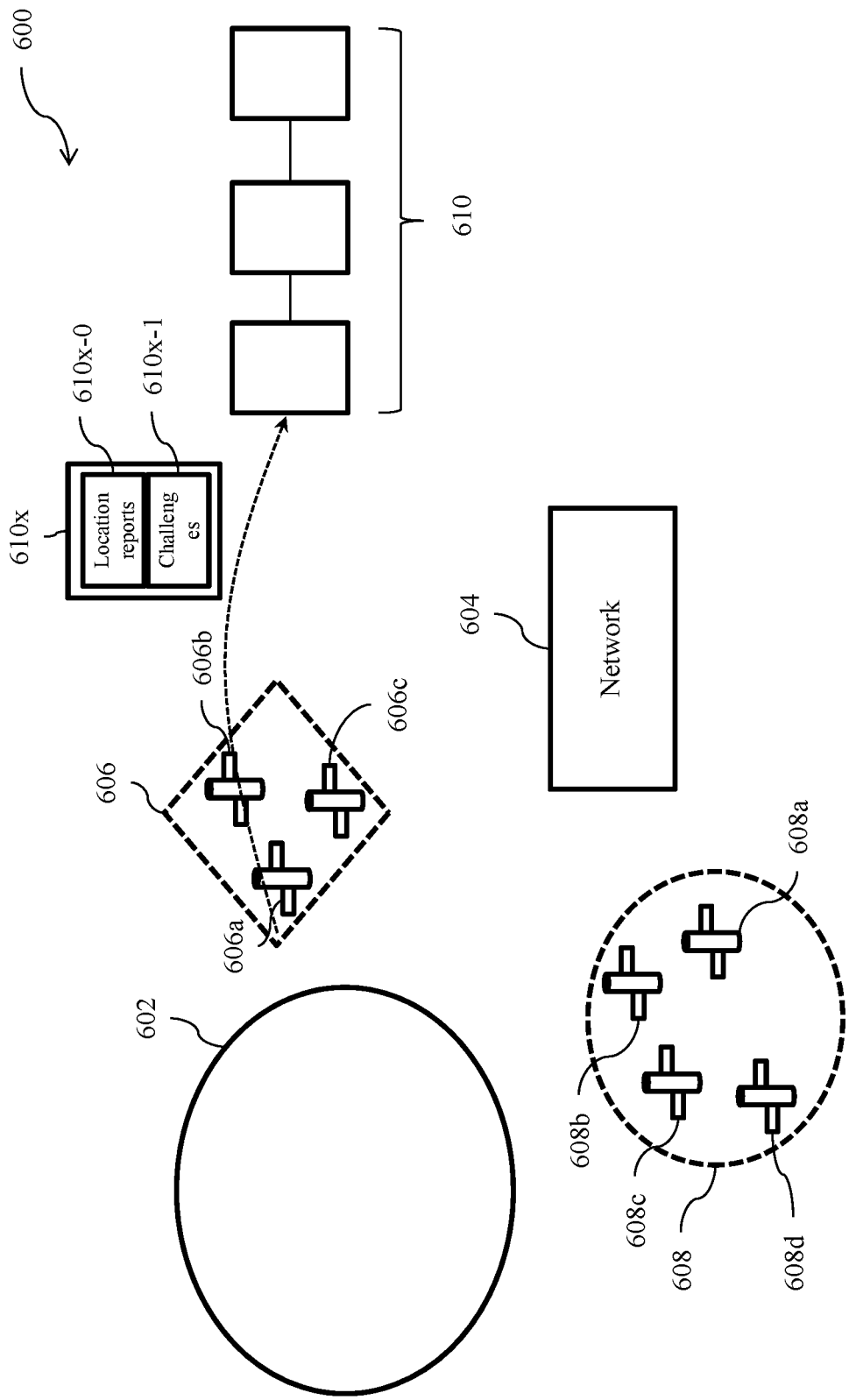
FIG. 6 illustrates an exemplary scenario showing a plurality of constellations around the earth, according to some other embodiments of the present disclosure.

FIG. 6 illustrates an exemplary scenario 600 showing a plurality of constellations 606 and 608 around the earth 602, according to some other embodiments of the present disclosure. FIG. 6 is explained in conjunction with FIG. 3A-FIG. 5. The constellations 606 and 608 may correspond to the constellations 306 and 308. Satellites 606a, 606b, and 606c of the constellation 606 may correspond to the satellites 306a, 306b, and 306c of the constellation 306. Satellites 608a, 608b, 608c, and 608d of the constellation 608 may correspond to the satellites 308a, 308b, 308c, and 308d of the constellation 308. According to an embodiment, the protocol 500 may be executed by a network 604 (i.e., the network 304) as a permissioned block chain protocol. In this embodiment, the network 604 may be a blockchain based network that is formed by constellation operators of the constellations 606 and 608 or satellite operators of each satellite in the constellations 606 and 608.

Upon executing the permissioned block chain protocol, the network 604 may issue the challenge(s) as cryptographic puzzle(s). As a part of issuing the challenge, the first verifier satellite (e.g., the first satellite 608a), the target satellite (e.g., the second satellite 606c), and the second verifier satellite (e.g., the third satellite 608b) are identified by the network 604. According to the permissioned block chain protocol, to complete the cryptographic puzzle, the first verifier satellite, the target satellite, and the second verifier satellite participate in the telemetric exchange as explained in the detailed description of FIG. 3B. According to the permissioned block chain protocol, the first verifier satellite (or the network 604) may determine the posterior estimated position of the target satellite as one of the possibilities: the self-reported verified position, the self-reported unverifiable position, the self-reported unverified position, or the unreported position, thereby a consensus in determining the posterior estimated position is achieved. According to permissioned block chain protocol, the first verifier satellite (or the network 604) may record the determined posterior estimated position of the target satellite into the records of the positions of the target satellite, as explained in the detailed description of FIG. 4A. In an example embodiment, to record the determined posterior estimated position of the target satellite into the records of the positions of the target satellite, the first verifier satellite (or the network 604) may log the determined posterior estimated position of the target satellite as a block chain transaction. Thereby, a block 610x recording the determined posterior estimated position of the target satellite may be updated into a chain of blocks 610. The block 610x may further include data about location reports 610x-0 recorded by the first verifier satellite, the target satellite, the second verifier satellite, and the at least one observer satellites. Furthermore, the block 610x may further include data about issued and complete challenges 610x-1. According to permissioned block chain protocol, the first verifier satellite (or the network 604) may be further configured to withdraw the privilege associated with the target satellite, as explained in the detailed description of FIG. 5.

According to the permissioned block chain protocol, to prevent the distributed satellite position verification system from faulty or malicious communication such as Byzantine fault, the distributed satellite position verification system may be implemented by a Practical Byzantine Fault Tolerance (PBFT) algorithm of Hyper-ledger Fabric.

The above description provides exemplary embodiments only, and is not intended to limit the scope, applicability, or configuration of the disclosure. Rather, the above description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the above description to provide a thorough understanding of the embodiments. However, understood by one of ordinary skill in the art may be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination may correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Although the present disclosure has been described with reference to certain preferred embodiments, it is to be understood that various other adaptations and modifications may be made within the spirit and scope of the present disclosure. Therefore, it is the aspect of the append claims to cover all such variations and modifications as come within the true spirit and scope of the present disclosure.

The invention claimed is:

1. A satellite configured to implement a protocol associated with a distributed satellite position verification system, the satellite comprising:
    a positioning system configured to estimate a current position of the satellite at a current instance of time;
    a transceiver configured to participate in a telemetric exchange with one or more other satellites; and
    a processor coupled with stored instructions implementing the protocol, the stored instructions when executed by the processor cause the satellite to:
        generate a report recording the estimated current position of the satellite;
        verify records of positions of the one or more other satellites in the distributed satellite position verification system including a first satellite, a second satellite, and a third satellite, wherein: the first satellite is configured to perform a first operation, the second satellite is configured to perform a second operation, the third satellite is configured to perform a third operation, wherein according to the protocol, the satellite is configured to perform, at different time instances, the first operation, the second operation, or the third operation to act as the first satellite, the second satellite, or the third satellite respectively, and wherein according to the protocol, the first satellite is configured to verify at least some positions in the records of positions of the second satellite by performing the first operation, such that the first satellite is configured to:
            determine a verified position of the second satellite by participating in the telemetric exchange with the second satellite and the third satellite;
            calculate a deviation between the verified position of the second satellite and a prior estimated position of the second satellite; and
            record the verified position into the records of positions of the second satellite, based on the calculated deviation.

2. The satellite of claim 1, wherein to participate in the telemetric exchange, the first satellite is further configured to exchange a plurality of radio signal with each of the second satellite and the third satellite in a predefined order.

3. The satellite of claim 2, wherein to determine the verified position of the second satellite, the first satellite is further configured to:
    determine a position of the second satellite at a particular time instance, based on at least one physical property of the radio signals;
    determine a confidence value associated with the determined position of the second satellite at the particular time instance; and
    determine the verified position of the second satellite, based on the confidence value.

4. The satellite of claim 3, wherein to determine the verified position of the second satellite, the first satellite is further configured to:
    compare the confidence value with a predefined confidence value bound;
    determine the verified position of the second satellite as a self-reported verified position, when the confidence value is not greater than the predefined confidence bound; and
    determine the verified position of the second satellite as a self-reported unverifiable position, when the confidence value is greater than the predefined confidence bound.

5. The satellite of claim 3, wherein to determine the position of the second satellite at the particular time instance, the first satellite is further configured to identify at least one observer satellite for determining the position of the second satellite.

6. The satellite of claim 1, wherein the calculated deviation is a Euclidean distance between the verified position of the second satellite and the prior estimated position of the second satellite.

7. The satellite of claim 1, wherein to record the verified position of the second satellite into the records of positions of the second satellite, the first satellite is further configured to:
    compare the calculated deviation with a predefined deviation bound; and
    record the verified position into the records of positions of the second satellite, when the calculated deviation is not greater than the predefined deviation bound.

8. The satellite of claim 1, wherein the protocol further comprises operations to withdraw a privilege associated with the second satellite, based on at least one of a trust violation score, a confidence violation score, and a participation violation score.

9. The satellite of claim 8, wherein to withdraw the privilege associated with the second satellite, the protocol further comprises the operations to:
    calculate the trust violation score for the second satellite within a window of a predefined length of verified positions associated with the second satellite;
    compare the calculated trust violation score with a predefined trust violation score bound; and
    withdraw the privilege associated with the second satellite, when the calculated trust violation score is greater than the predefined trust violation score bound.

10. The satellite of claim 8, wherein to withdraw the privilege associated with the second satellite, the protocol further comprises the operations to:
    calculate the confidence violation score for the second satellite within a window of a predefined length of verified positions associated with the second satellite;
    compare the calculated confidence violation score with a predefined confidence violation score bound; and
    withdraw the privilege associated with the second satellite, when the calculated confidence violation score is greater than the predefined confidence violation score bound.

11. The satellite of claim 8, wherein to withdraw the privilege associated with the second satellite, the protocol further comprises the operations to:
    calculate the participation violation score for the second satellite within a window of a predefined length of verified positions associated with the second satellite;
    compare the calculated participation violation score with a predefined participation violation score bound; and withdraw the privilege associated with the second satellite, when the calculated participation violation score is greater than the predefined participation violation score bound.

12. The satellite of claim 1, wherein to record the verified position into the records of positions of the second satellite, the first satellite is further configured to log the verified position into the records of positions of the second satellite as a block chain transaction.

13. The satellite of claim 1, wherein the first satellite and the third satellite are within a line of sight (LOS) of the second satellite.

14. The satellite of claim 1, wherein the satellite, at one time instance of the different time instances, is configured to act as the first satellite, the second satellite, or the third satellite, based on a trust score associated with the satellite.

15. A method for implementing a protocol associated with a distributed satellite position verification system, comprising:

estimating, by a positioning system, a current position of a satellite at a current instance of time;

participating, by a transceiver, in a telemetric exchange with one or more other satellites;

generating, by a processor coupled with stored instructions implementing the protocol, a report for recording the estimated current position of the satellite;

verifying, by the processor, records of positions of the one or more other satellites in the distributed satellite position verification system including a first satellite, a second satellite, and a third satellite, wherein: the first satellite is configured for performing a first operation, the second satellite is configured for performing a second operation, the third satellite is configured for performing a third operation, wherein according to the protocol, the satellite is configured for performing, at different time instances, the first operation, the second operation, or the third operation to act as the first satellite, the second satellite, or the third satellite respectively, and wherein according to protocol, the first satellite is configured for verifying at least some positions in the records of positions of the second satellite by performing the first operation, such that the first satellite is configured for:

determining a verified position of the second satellite by participating in the telemetric exchange with the second satellite and the third satellite;

calculating a deviation between the verified position of the second satellite and a prior estimated position of the second satellite; and recording the verified position into the records of positions of the second satellite, based on the calculated deviation.

16. A non-transitory computer readable storage medium embodied thereon a program executable by a satellite for performing a method associated with a distributed satellite position verification system, the method comprising:

estimating, by a positioning system, a current position of the satellite at a current instance of time;

participating, by a transceiver, in a telemetric exchange with one or more other satellites;

generating, by a processor coupled with stored instructions implementing the protocol, a report for recording the estimated current position of the satellite;

verifying, by the processor, records of positions of the one or more other satellites in the distributed satellite position verification system including a first satellite, a second satellite, and a third satellite, wherein: the first satellite is configured for performing a first operation, the second satellite is configured for performing a second operation, the third satellite is configured for performing a third operation, wherein according to the protocol, the satellite is configured for performing, at different time instances, the first operation, the second operation, or the third operation to act as the first satellite, the second satellite, or the third satellite respectively, and wherein according to protocol, the first satellite is configured for verifying at least some positions in the records of positions of the second satellite by performing the first operation, such that the first satellite is configured for:

determining a verified position of the second satellite by participating in the telemetric exchange with the second satellite and the third satellite;

calculating a deviation between the verified position of the second satellite and a prior estimated position of the second satellite; and recording the verified position into the records of positions of the second satellite, based on the calculated deviation.

* * * * *